(12) United States Patent
Bonwick et al.

(10) Patent No.: US 8,341,342 B1
(45) Date of Patent: Dec. 25, 2012

(54) STORAGE SYSTEM WITH INCREMENTAL MULTI-DIMENSIONAL RAID

(75) Inventors: Jeffrey S. Bonwick, Los Altos, CA (US); William H. Moore, Fremont, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/428,817

(22) Filed: Mar. 23, 2012

(51) Int. Cl.
*G06F 12/00* (2006.01)

(52) U.S. Cl. ........ 711/103; 711/111; 711/114; 711/156; 711/E12.001

(58) Field of Classification Search .................. 711/114, 711/103, 111, 156, E12.001
See application file for complete search history.

(56) References Cited

U.S. PATENT DOCUMENTS

| | | | |
|---|---|---|---|
| 6,351,838 B1 | 2/2002 | Amelia | |
| 7,398,418 B2 | 7/2008 | Soran et al. | |
| 7,406,621 B2 | 7/2008 | Lubbers et al. | |
| 7,543,100 B2 | 6/2009 | Singhal et al. | |
| 7,752,389 B1 * | 7/2010 | Fan | 711/114 |
| 7,934,120 B2 | 4/2011 | Zohar et al. | |
| 8,078,906 B2 | 12/2011 | Yochai et al. | |
| 8,145,840 B2 | 3/2012 | Koul et al. | |
| 8,200,887 B2 | 6/2012 | Bennett | |
| 2005/0166083 A1 | 7/2005 | Frey et al. | |
| 2005/0223156 A1 | 10/2005 | Lubbers et al. | |
| 2006/0085594 A1 | 4/2006 | Roberson et al. | |
| 2008/0168225 A1 | 7/2008 | O'Connor | |
| 2009/0187786 A1 * | 7/2009 | Jones et al. | 714/7 |
| 2010/0199125 A1 | 8/2010 | Reche | |
| 2012/0079318 A1 | 3/2012 | Colgrove et al. | |
| 2012/0089778 A1 | 4/2012 | Au et al. | |
| 2012/0166712 A1 | 6/2012 | Lary | |

OTHER PUBLICATIONS

Kazmi, A., "PCI Express™ Basics & Applications in Communication Systems," PCI-SIG Developers Conference, 2004 (50 pages).
Percival, D., "Multicast Over PCI Express®," PCI-SIG Developer's Conference Europe, 2009 (33 pages).
Huffman, A., NVM Express Revision 1.0b, Jul. 12, 2011 (126 pages).
Regula, J., Using Non-transparent Bridging in PCI Express Systems, Jun. 1, 2004 (31 pages).
Anvin, H., "The mathematics of RAID-6", retrieved from the Internet at http://www.cs.utk.edu/'plank/plank/papers/CS-96-332.html, Jan. 20, 2004 (9 pages).

* cited by examiner

*Primary Examiner* — Yong Choe
(74) *Attorney, Agent, or Firm* — Osha Liang LLP

(57) ABSTRACT

A method for storing data including receiving a request to write data and in response the request, selecting a RAID grid location in a RAID grid to write the data. The method further includes writing the data to memory, updating a data structure to indicate that the RAID grid location is filled, identifying a parity value in the RAID grid to update, where the parity value is associated with a second RAID grid location in the RAID grid, updating the parity value using the data and the parity value to obtain an updated parity value and storing the updated parity value in the memory. Prior to the first data grid being filled determining a physical address in persistent storage corresponding to the RAID grid location and writing the data to the first physical address.

20 Claims, 28 Drawing Sheets

STORAGE SYSTEM WITH INCREMENTAL MULTI-DIMENSIONAL RAID

BACKGROUND

In order to protect against potential loss of data in a storage system, it is often advantageous to implement a replication scheme. Current replication schemes are only able to sustain a limited amount of error before data within the storage system is unable to be read.

SUMMARY

In general, in one aspect, the invention relates to a method for storing data. The method including receiving a first request to write first data, in response the first request, selecting, a first RAID grid location in a first RAID grid to write the first data, wherein the first RAID grid location is in a first data grid in the first RAID grid, writing the first data to memory, updating a data structure to indicate that the first RAID grid location is filled, identifying a first parity value in the first RAID grid to update in response to the first RAID grid location being filled, wherein the first parity value is associated with a second RAID grid location in the first RAID grid, updating the first parity value using the first data and the first parity value to obtain an updated first parity value, wherein the updated first parity value is stored in the memory, and wherein the updated first parity value is associated with the second RAID grid location, prior to the first data grid being filled: determining a first physical address in persistent storage corresponding to the first RAID grid location, writing the first data to a first physical location in persistent storage corresponding to the first physical address.

In general, in one aspect, the invention relates to a system. The a control module comprises an Input/Output module (IOM), a processor, a first memory connected to the processor, a switch fabric, wherein the IOM and the processor are connected to the switch fabric. The system further includes a first storage module connected to the control module using the switch fabric and comprising a second memory, a first persistent storage. The system further includes a second storage module connected to the control module using the switch fabric and comprising a third memory, a second persistent storage, wherein the control module is configured to: receive a first request to write first data, in response the first request, select, a first RAID grid location in a first RAID grid to write the first data, wherein the first RAID grid location is in a first data grid in the first RAID grid, write the first data to the second memory, update a data structure in the first memory to indicate that the first RAID grid location is filled, identify a first parity value in the first RAID grid to update in response to the first RAID grid location being filled, wherein the first parity value is associated with a second RAID grid location in the first RAID grid, update the first parity value using the first data and the first parity value to obtain an updated first parity value, wherein the updated first parity value is stored in the second memory, and wherein the updated first parity value is associated with the second RAID grid location, prior to the first data grid being filled: determine a first physical address in the first persistent storage corresponding to the first RAID grid location, write the first data to a first physical location in the first persistent storage corresponding to the first physical address.

In general, in one aspect, the invention relates to a non-transitory computer readable medium comprising instructions, which when executed by a processor perform a method, the method comprising receiving a first request to write first data, in response the first request, selecting, a first RAID grid location in a first RAID grid to write the first data, wherein the first RAID grid location is in a first data grid in the first RAID grid, writing the first data to memory, updating a data structure to indicate that the first RAID grid location is filled, identifying a first parity value in the first RAID grid to update in response to the first RAID grid location being filled, wherein the first parity value is associated with a second RAID grid location in the first RAID grid, updating the first parity value using the first data and the first parity value to obtain an updated first parity value, wherein the updated first parity value is stored in the memory, and wherein the updated first parity value is associated with the second RAID grid location, prior to the first data grid being filled: determining a first physical address in persistent storage corresponding to the first RAID grid location, writing the first data to a first physical location in persistent storage corresponding to the first physical address.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-10D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for replicating data using a multi-dimensional RAID scheme. More specifically, embodiments of the invention provide a method and system for implementing an incremental 2D RAID scheme and a 3D RAID scheme.

Using a 2D RAID scheme, the data stored within a RAID grid implementing such a RAID scheme may be recovered when there are more than two errors in a given RAID stripe. Similarly, using a 3D RAID scheme, the data stored within a RAID cube implementing such a RAID scheme may be recovered when there are more than two errors in a given RAID stripe. Further, in various embodiments of the invention, data may be recovered when there is a failure in more than one independent fault domain (IFD).

In one or more embodiments of the invention, an IFD corresponds to a failure mode which results in the data at a given location being inaccessible. Each IFD corresponds to an independent mode of failure in the storage module or across storage modules. For example, if the data is stored in NAND flash, where the NAND flash is part of the storage module (which includes multiple NAND dies), then the IFDs may be (i) flash module, (ii) channel (i.e., the channel used by the storage module controller in the storage module to write data to a solid state memory module), and (iii) NAND die.

Figure 1A:
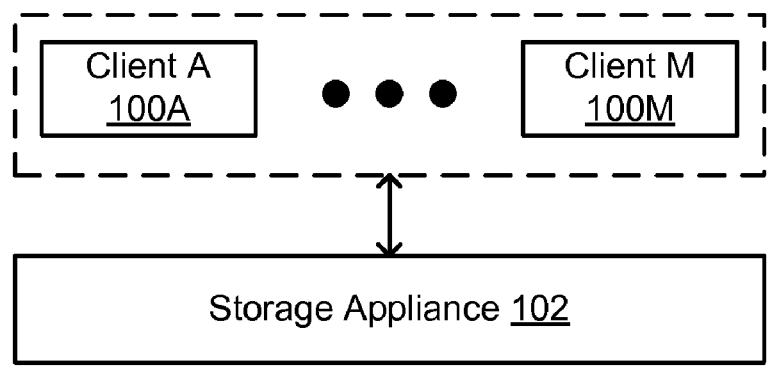
FIGS. 1A-1E show systems in accordance with one or more embodiments of the invention.

FIGS. 1A-1E show systems in accordance with one or more embodiments of the invention. Referring to FIG. 1A, the system includes one or more clients (client A (100A), client M (100M)) operatively connected to a storage appliance (102).

In one embodiment of the invention, clients (100A, 100M) correspond to any system that includes functionality to issue a read request to the storage appliance (102) and/or issue a write request to the storage appliance (102). Though not shown in FIG. 1A, each of the clients (100A, 100M) may include a client processor and client memory. Additional details about components in a client are described in FIG. 1D below. In one embodiment of the invention, the clients (100A, 100M) are configured to communicate with the storage appliance (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the invention is not limited to the aforementioned protocols.

In one or more embodiments of the invention, if the client implements PCI, PCI-express, or NVMe, then the client includes a root complex (not shown). In one embodiment of the invention, the root complex is a device that connects the client processor and client memory to the PCIe Fabric. In one embodiment of the invention, the root complex is integrated into the client processor.

Figure 1B:
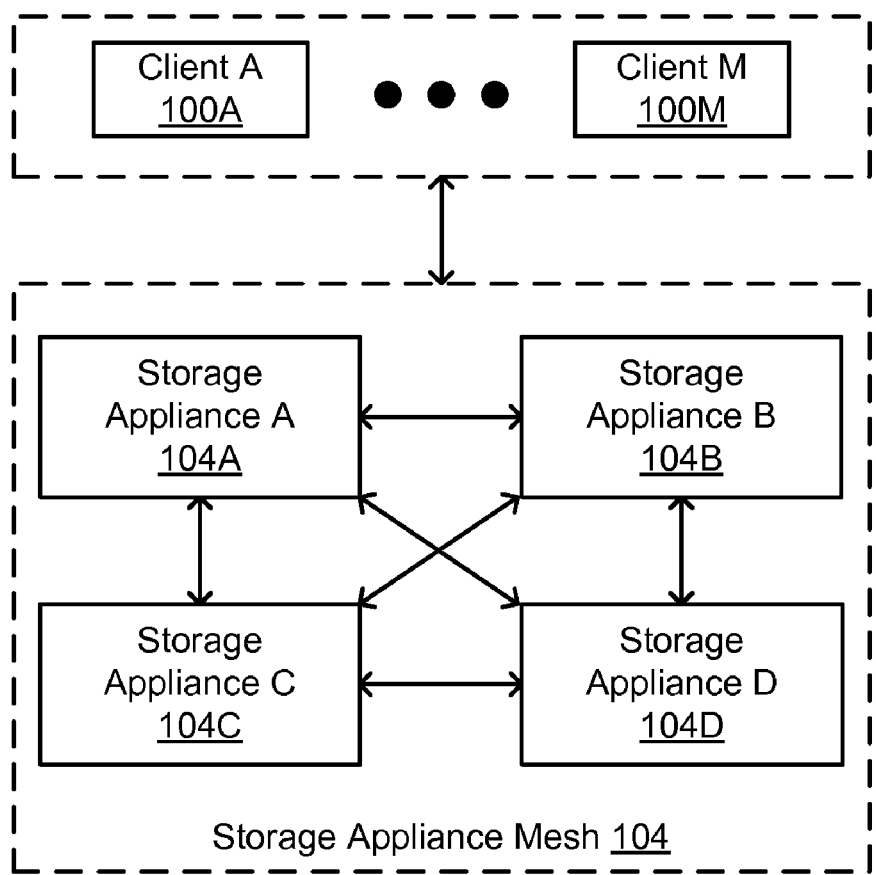
Figure 1C:
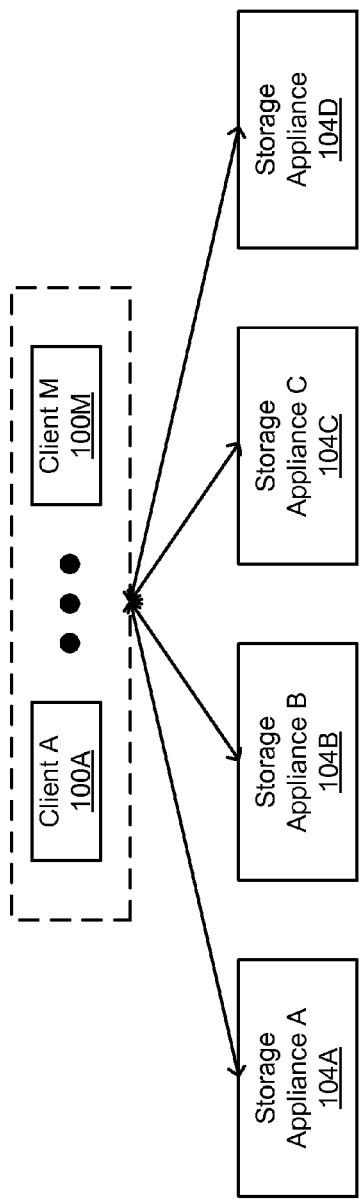
Figure 1D:
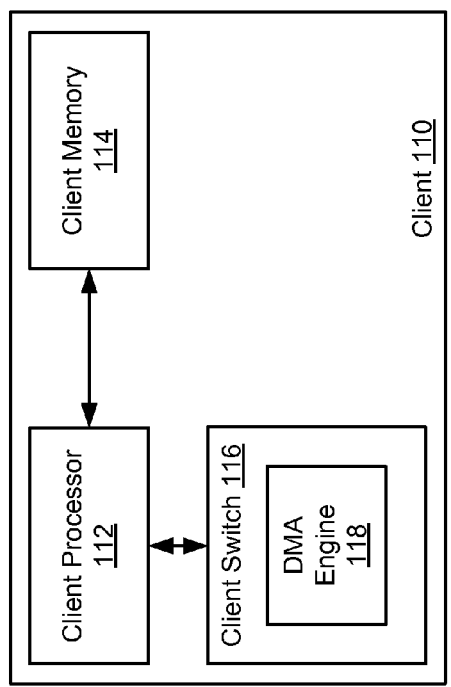
Figure 2A:
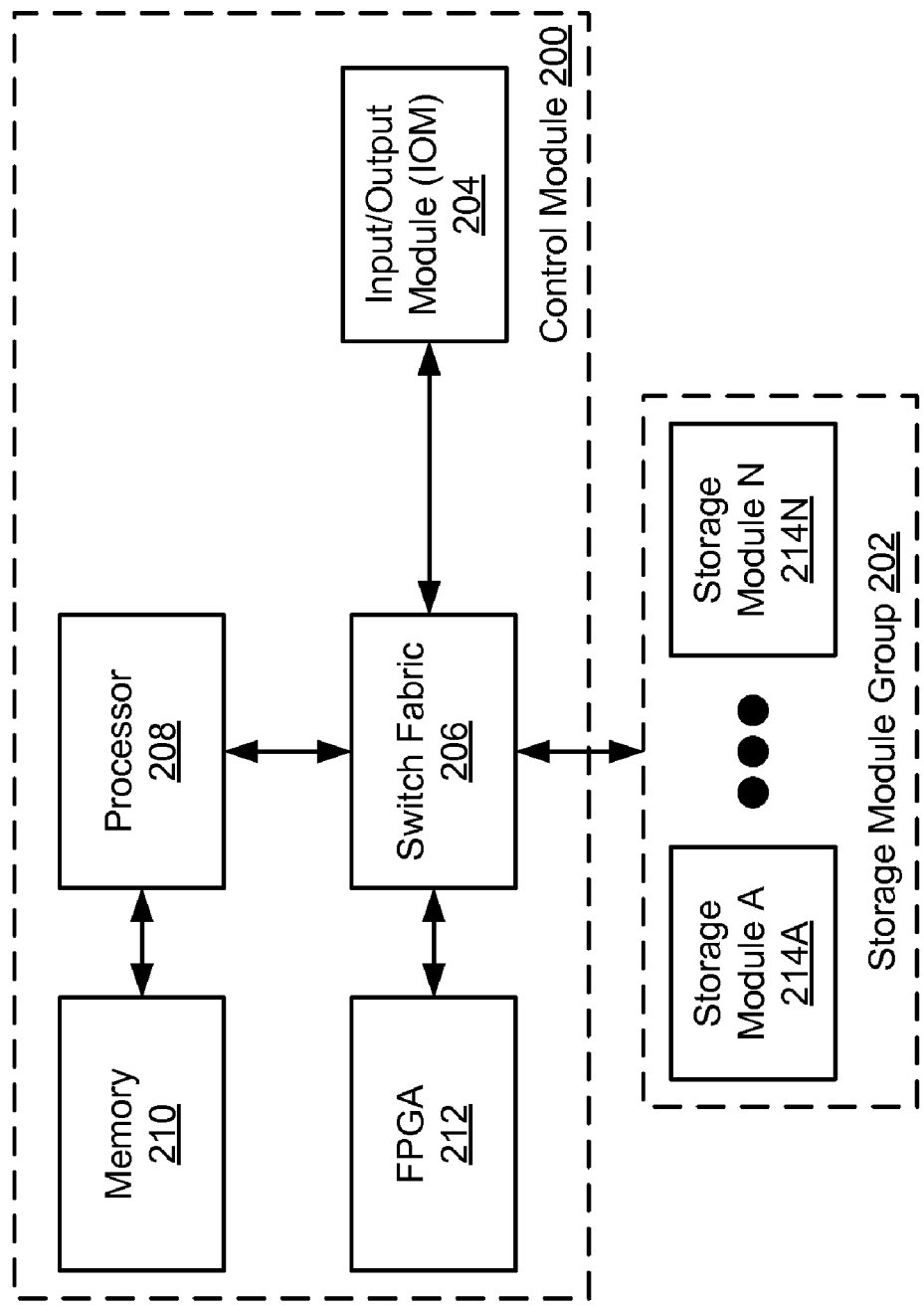
FIGS. 2A-2D show storage appliances in accordance with one or more embodiments of the invention.

In one embodiment of the invention, the PCIe Fabric includes root complexes and endpoints which are connected via switches (e.g., client switch (116) in FIG. 1D and switches within the switch fabric, e.g., switch fabric (206) in FIG. 2A). In one embodiment of the invention, an endpoint is a device other than a root complex or a switch that can originate PCI transactions (e.g., read request, write request) or that is a target of PCI transactions.

In one embodiment of the invention, a single client and a single storage appliance may be considered part of a single PCIe Fabric. In another embodiment of the invention, any combination of one or more clients and one or more storage appliances may be considered part of a single PCIe Fabric. Further, if the individual components within the storage appliance communicate using PCIe, and individual components in the client (see FIG. 1D) communicate using PCIe, then all the components in the storage appliance and the client may be considered part of a single PCIe Fabric. Those skilled in the art will appreciate that various embodiments of the invention may be implemented using another type of fabric without departing from the invention.

Continuing with FIG. 1A, in one embodiment of the invention, the storage appliance (102) is a system that includes volatile and persistent storage and is configured to service read requests and/or write requests from one or more clients (100A, 100M). Various embodiments of the storage appliance (102) are described below in FIGS. 2A-2D.

Referring to FIG. 1B, FIG. 1B shows a system in which clients (100A, 100M) are connected to multiple storage appliances (104A, 104B, 104C, 104D) arranged in a mesh configuration (denoted as storage appliance mesh (104) in FIG. 1B). As shown in FIG. 1B, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, each of the clients (100A, 100M) may be directly connected to one or more storage appliances (104A, 104B, 104C, 104D) in the storage appliance mesh (104). Those skilled in the art will appreciate that the storage appliance mesh may be implemented using other mesh configurations (e.g., partially connected mesh) without departing from the invention.

Referring to FIG. 1C, FIG. 1C shows a system in which clients (100A, 100M) are connected to multiple storage appliances (104A, 104B, 104C, 104D) arranged in a fan-out configuration. In this configuration, each client (100A, 100M) is connected to one or more of the storage appliances (104A, 104B, 104C, 104D); however, there is no communication between the individual storage appliances (104A, 104B, 104C, 104D).

Referring to FIG. 1D, FIG. 1D shows a client in accordance with one or more embodiments of the invention. As shown in FIG. 1D, the client (110) includes a client processor (112), client memory (114), and a client switch (116). Each of these components is described below.

In one embodiment of the invention, the client processor (112) is a group of electronic circuits with a single core or multiple cores that are configured to execute instructions. In one embodiment of the invention, the client processor (112) may be implemented using a Complex Instruction Set (CISC) Architecture or a Reduced Instruction Set (RISC) Architecture. In one or more embodiments of the invention, the client processor (112) includes a root complex (as defined by the PCIe protocol) (not shown). In one embodiment of the invention, if the client (110) includes a root complex (which may be integrated into the client processor (112)) then the client memory (114) is connected to the client processor (112) via the root complex. Alternatively, the client memory (114) is directly connected to the client processor (112) using another point-to-point connection mechanism. In one embodiment of the invention, the client memory (114) corresponds to any volatile memory including, but not limited to, Dynamic Random-Access Memory (DRAM), Synchronous DRAM, SDR SDRAM, and DDR SDRAM.

In one embodiment of the invention, the client memory (114) includes one or more of the following: a submission queue for the client processor and a completion queue for the client processor. In one embodiment of the invention, the storage appliance memory includes one or more submission queues for client processors visible to a client through the fabric, and the client memory includes one or more completion queues for the client processor visible to the storage appliance through the fabric. In one embodiment of the invention, the submission queue for the client processor is used to send commands (e.g., read request, write request) to the client processor. In one embodiment of the invention, the completion queue for the client processor is used to signal the client processor that a command it issued to another entity has been completed. Embodiments of the invention may be implemented using other notification mechanisms without departing from the invention.

In one embodiment of the invention, the client switch (116) includes only a single switch. In another embodiment of the invention, the client switch (116) includes multiple interconnected switches. If the client switch (116) includes multiple switches, each switch may be connected to every other switch, may be connected to a subset of the switches in the switch fabric, or may only be connected to one other switch. In one embodiment of the invention, each of the switches in the client switch (116) is a combination of hardware and logic (implemented, for example, using integrated circuits) (as defined by the protocol(s) the switch fabric implements) that is configured to permit data and messages to be transferred between the client (110) and the storage appliances (not shown).

In one embodiment of the invention, when the clients (100A, 100M) implement one or more of the following protocols PCI, PCIe, or PCI-X, the client switch (116) is a PCI switch.

In such embodiments, the client switch (116) includes a number of ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In one embodiment of the invention, in order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

In one embodiment of the invention, the client switch (116) is configured such that at least a portion of the client memory (114) is directly accessible to the storage appliance. Said another way, a storage appliance on one side of the client switch may directly access, via the client switch, client memory on the other side of the client switch.

In one embodiment of the invention, the client switch (116) includes a DMA engine (118). In one embodiment of the invention, the DMA engine (118) may be programmed by either the client processor or a storage appliance connected to the client switch. As discussed above, the client switch (116) is configured such that at least a portion of the client memory (114) is accessible to the storage appliance or storage modules. Accordingly, the DMA engine (118) may be programmed to read data from an address in the portion of the client memory that is accessible to the storage appliance and directly write a copy of such data to memory in the storage appliance or storage modules. Further, the DMA engine (118) may be programmed to read data from the storage appliance and directly write a copy of such data to an address in the portion of the client memory that is accessible to the storage appliance.

In one embodiment of the invention, the DMA engine (118) supports multicasting. In such embodiments, a processor in the storage appliance (see FIG. 2A) may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. In one embodiment of the invention, the switch processes all of the multicast group descriptors in parallel.

Continuing with the discussion of FIG. 1D, those skilled in the art will appreciate that while FIG. 1D shows a client switch (116) located in the client (110), the client switch (116) may be located external to the client without departing from the invention. Further, those skilled in the art will appreciate that the DMA engine (118) may be located external to the client switch (116) without departing from the invention.

Figure 1E:
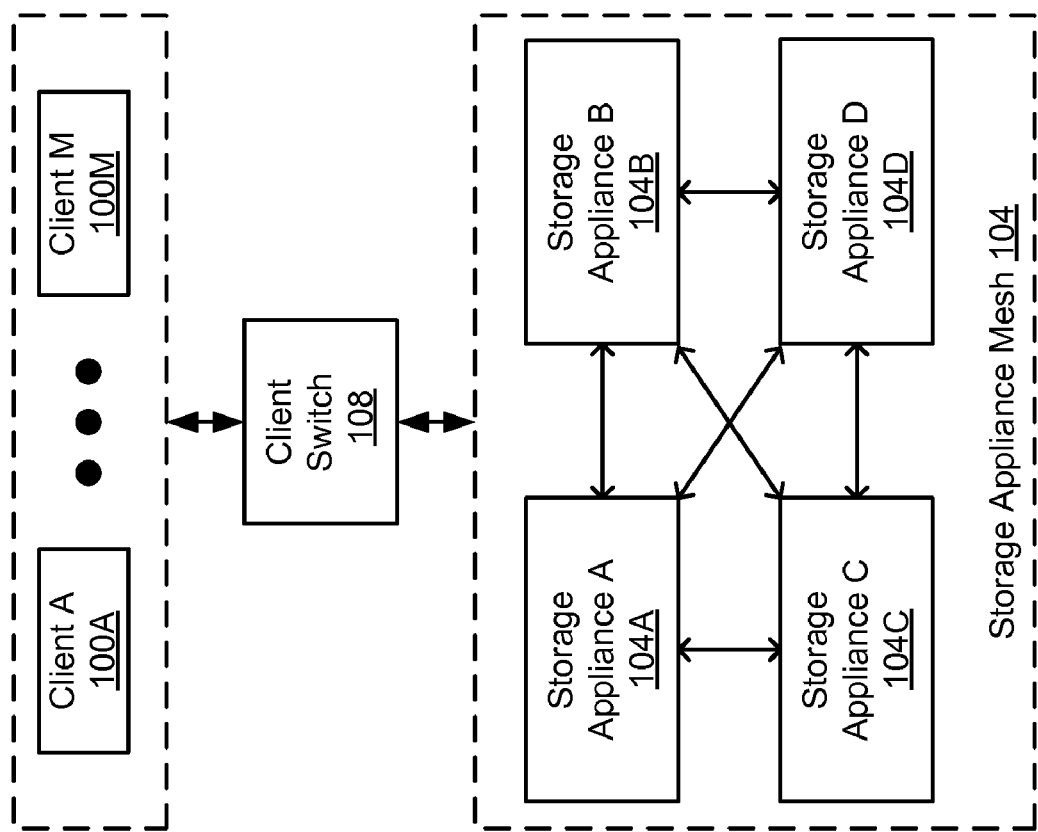

Referring FIG. 1E, FIG. 1E shows a system in which clients (100A, 100M) are connected, via a client switch (108), to multiple storage appliances (104A, 104B, 104C, 104D) arranged in a mesh configuration (denoted as storage appliance mesh (104) in FIG. 1E). In the embodiment shown in FIG. 1E, each client (100A, 100M) does not include its own client switch—rather, all of the clients share a client switch (108). As shown in FIG. 1E, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, the client switch (108) may be directly connected to one or more storage appliances (104A, 104B, 104C, 104D) in the storage appliance mesh (104). Those skilled in the art will appreciate that storage appliance mesh may be implemented using other mesh configurations (e.g., partially connected mesh) without departing from the invention.

Though not shown in FIG. 1E, each client may include its own client switch (as shown in FIG. 1D) but may be connected to the storage appliance mesh (104) using a switch fabric (defined below).

Those skilled in the art will appreciate that while FIGS. 1A-1E show storage appliances connected to a limited number of clients, the storage appliances may be connected to any number of clients without departing from the invention. Those skilled in the art will appreciate that while FIGS. 1A-1E show various system configurations, the invention is not limited to the aforementioned system configurations. Further, those skilled in the art will appreciate that the clients (regardless of the configuration of the system) may be connected to the storage appliance(s) using a switch fabric (not shown) (described below) without departing from the invention.

FIGS. 2A-2D show embodiments of storage appliances in accordance with one or more embodiments of the invention. Referring to FIG. 2A, the storage appliance includes a control module (200) and a storage module group (202). Each of these components is described below. In general, the control module (200) is configured to manage the servicing of read and write requests from one or more clients. In particular, the control module is configured to receive requests from one or more clients via the IOM (discussed below), to process the request (which may include sending the request to the storage module), and to provide a response to the client after the request has been serviced. Additional details about the components in the control module are included below. Further, the operation of the control module with respect to servicing read and write requests is described below with reference to FIGS. 4-10D.

Continuing with the discussion of FIG. 2A, in one embodiment of the invention, the control module (200) includes an Input/Output Module (IOM) (204), a switch fabric (206), a processor (208), a memory (210), and, optionally, a Field Programmable Gate Array (FPGA) (212). In one embodiment of the invention, the IOM (204) is the physical interface between the clients (100A, 100M in FIGS. 1A-1E) and the other components in the storage appliance. The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE). Those skilled in the art will appreciate that the IOM may be implemented using protocols other than those listed above without departing from the invention.

Continuing with the discussion of FIG. 2A, the switch fabric (206) includes only a single switch. In another embodiment of the invention, the switch fabric (206) includes multiple interconnected switches. If the switch fabric (206) includes multiple switches, each switch may be connected to every other switch, may be connected to a subset of switches in the switch fabric, or may only be connected to one other switch in the switch fabric. In one embodiment of the invention, each of the switches in the switch fabric (206) is a combination of hardware and logic (implemented, for example, using integrated circuits) (as defined by the protocol(s) the switch fabric implements) that is configured to connect various components together in the storage appliance and to route packets (using the logic) between the various connected components. In one embodiment of the invention, the switch fabric (206) is physically connected to the IOM (204), processor (208), storage module group (202), and, if present, the FPGA (212). In one embodiment of the invention, all inter-component communication in the control module (200) (except between the processor (208) and memory (210)) passes through the switch fabric (206). Further, all communication between the control module (200) and the storage module group (202) passes through the switch fabric (206). In one embodiment of the invention, the switch fabric (206) is implemented using a PCI protocol (e.g., PCI, PCIe, PCI-X, or another PCI protocol). In such embodiments, all communication that passes through the switch fabric (206) uses the corresponding PCI protocol.

In one embodiment of the invention, if the switch fabric implements a PCI protocol, the switch fabric (206) includes a port for the processor (or, more specifically, a port for the root complex integrated in the processor (208) or for the root complex connected to the processor), one or more ports for storage modules (214A, 214N) (see FIG. 3) in the storage module group (202), a port for the FPGA (212) (if present), and a port for the IOM (204). In one or more embodiments of the invention, each of the aforementioned ports may be configured as a transparent bridge or a non-transparent bridge (as discussed above). Those skilled in the art will appreciate that while the switch fabric (206) has been described with respect to a PCI implementation, the switch fabric (206) may be implemented using other protocols without departing from the invention.

In one embodiment of the invention, at least one switch in the switch fabric (206) is configured to implement multicasting. More specifically, in one embodiment of the invention, the processor (208) is configured to generate a multicast group where the multicast group includes two or more members with each member specifying an address in the memory (210) and/or in the storage modules (214A, 214N). When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment of the invention, the address for each write generated by the switch is determined by adding a particular offset to the multicast address.

Continuing with FIG. 2A, the processor (208) is a group of electronic circuits with a single core or multiple-core that is configured to execute instructions. In one embodiment of the invention, the processor (208) may be implemented using a Complex Instruction Set (CISC) Architecture or a Reduced Instruction Set (RISC) Architecture. In one or more embodiments of the invention, the processor (208) includes a root complex (as defined by the PCIe protocol). In one embodiment of the invention, if the control module (200) includes a root complex (which may be integrated into the processor (208)) then the memory (210) is connected to the processor (208) via the root complex. Alternatively, the memory (210) is directly connected to the processor (208) using another point-to-point connection mechanism. In one embodiment of the invention, the memory (210) corresponds to any volatile memory including, but not limited to, Dynamic Random-Access Memory (DRAM), Synchronous DRAM, SDR SDRAM, and DDR SDRAM.

In one embodiment of the invention, the processor (208) is configured to create and update an in-memory data structure (not shown), where the in-memory data structure is stored in the memory (210). In one embodiment of the invention, the in-memory data structure includes mappings (direct or indirect) between logical addresses and physical storage addresses in the set of storage modules. In one embodiment of the invention, the logical address is an address at which the data appears to reside from the perspective of the client. In one embodiment of the invention, the logical address is (or includes) a hash value generated by applying a hash function (e.g. SHA-1, MD-5, etc.) to an n-tuple. In one embodiment of the invention, the n-tuple is <object ID, offset>, where the object ID defines a file and the offset defines a location relative to the starting address of the file. In another embodiment of the invention, the n-tuple is <object ID, offset, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset. Those skilled in the art will appreciate that multiple logical addresses may be mapped to a single physical address and that the logical address is not limited to the above embodiments.

Figure 3:
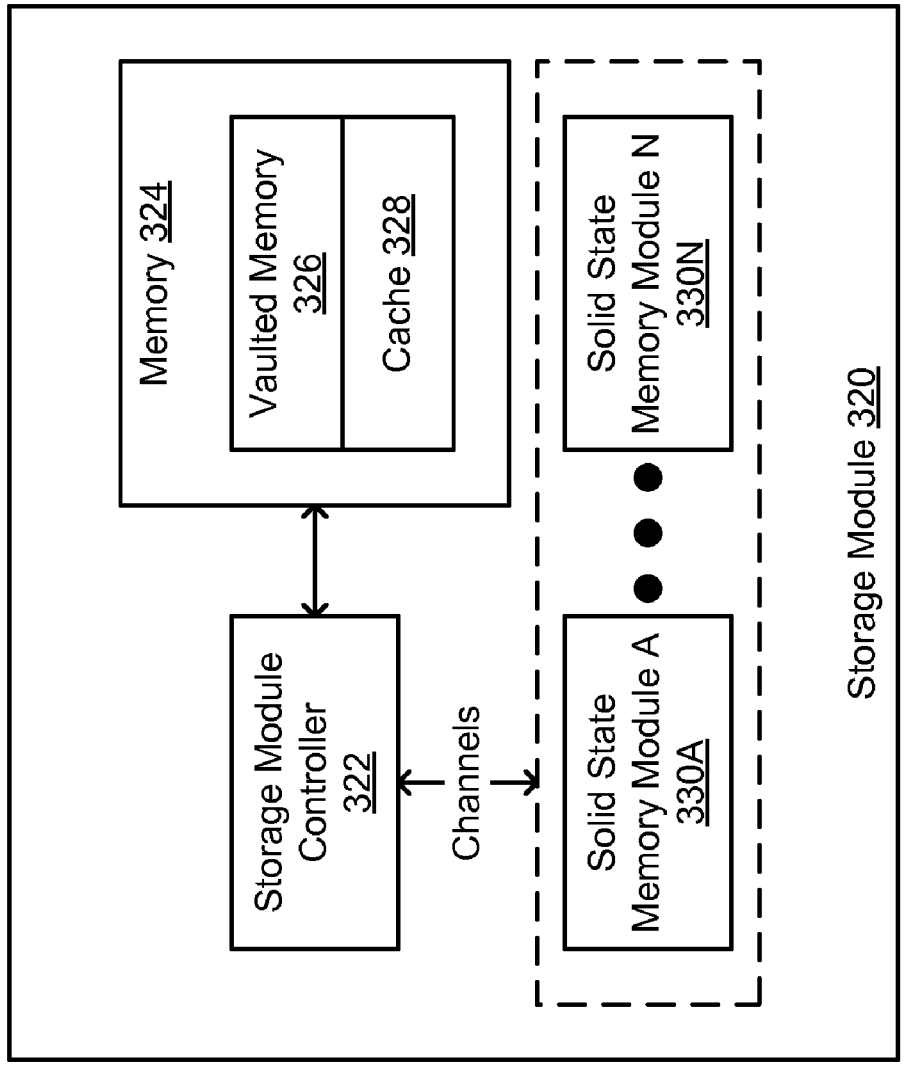
FIG. 3 shows a storage module in accordance with one or more embodiments of the invention.

In one embodiment of the invention, the physical address may correspond to (i) a location in the memory (210), (ii) a location in the vaulted memory (e.g., 324 in FIG. 3), or (iii) a location in a solid state memory module (e.g., 330A in FIG. 3). In one embodiment of the invention, the in-memory data structure may map a single hash value to multiple physical addresses if there are multiple copies of the data in the storage appliance.

In one embodiment of the invention, the memory (210) includes one or more of the following: a submission queue for the processor, a completion queue for the processor, a submission queue for each of the storage modules in the storage appliance and a completion queue for each of the storage modules in the storage appliance. In one embodiment of the invention, the submission queue for the processor is used to send commands (e.g., read request, write request) to the processor. In one embodiment of the invention, the completion queue for the processor is used to signal the processor that a command it issued to another entity has been completed. The submission and completion queues for the storage modules function in a similar manner.

In one embodiment of the invention, the processor includes functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). Further, the processor (via the switch fabric) may be configured to offload various types of processing to the FPGA (212). In one embodiment of the invention, the FPGA (212) includes functionality to calculate checksums for data that is being written to the storage module(s) and/or data that is being read from the storage module(s). Further, the FPGA (212) may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment of the invention, the storage module group (202) includes one or more storage modules (214A, 214N) each configured to store data. Storage modules are described below in FIG. 3.

In one embodiment of the invention, the processor (208) is configured to program one or more DMA engines in the system. For example, the processor (208) is configured to program the DMA engine in the client switch (see FIG. 1D). The processor (208) may also be configured to program the DMA engine in the storage module (see FIG. 3). In one embodiment of the invention, programming the DMA engine in the client switch may include creating a multicast group and generating descriptors for each of the members in the multicast group.

Figure 2B:
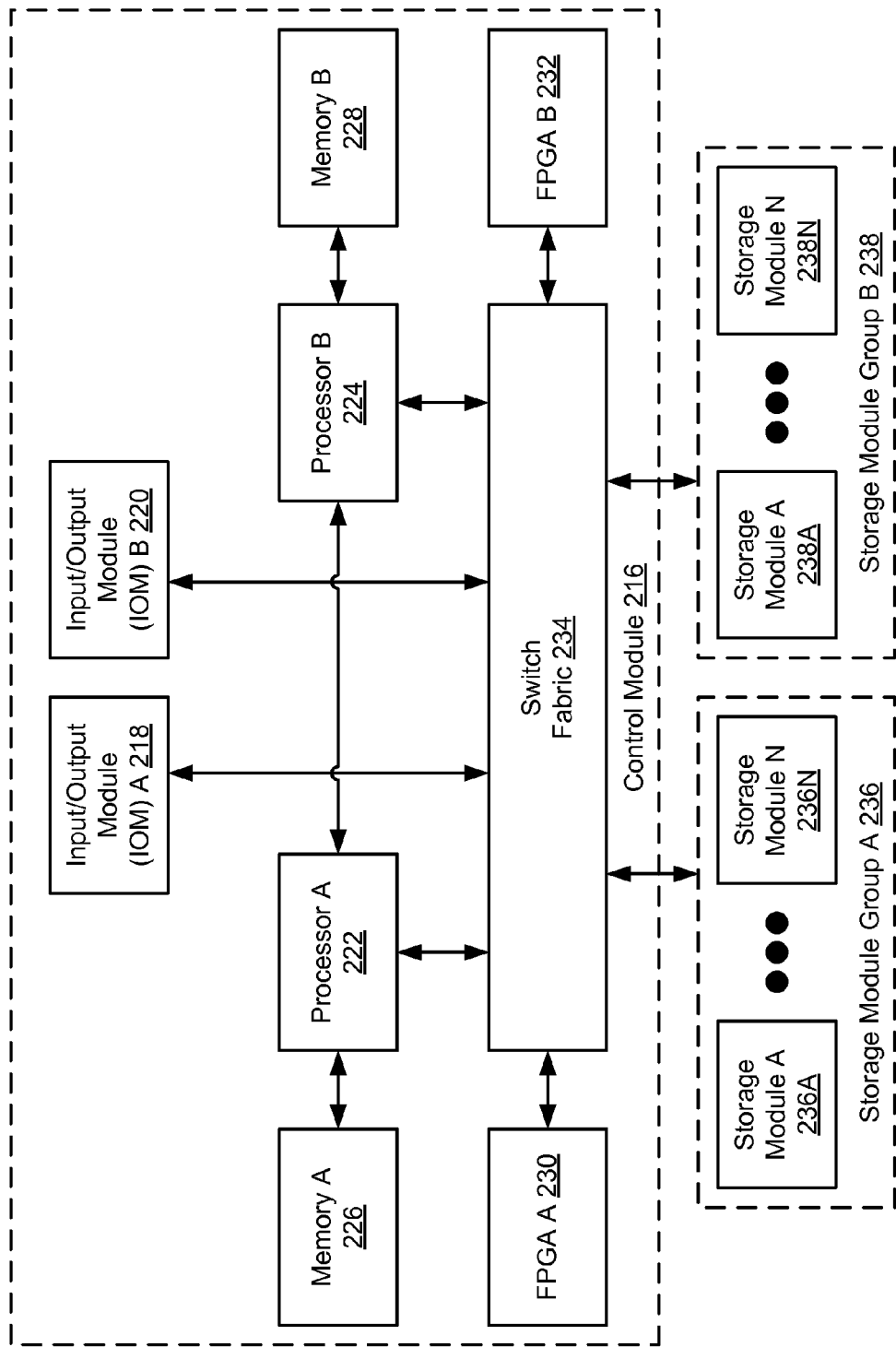

Turning to FIG. 2B, FIG. 2B shows a storage appliance in accordance with one or more embodiments of the invention. The storage appliance includes a control module (216) and at least two storage module groups (236, 238). The control module (216) includes a switch fabric (234), which is directly connected to IOM A (218), IOM B (220), processor A (222), processor B (224), (if present) FPGA A (230), (if present) FPGA B (232), storage modules (236A, 236N) in storage module group A (236) and storage modules (238A, 238N) in storage module group B (238). All communication between the aforementioned components (except between processor A (222) and processor B (224)) passes through the switch fabric (234). In one embodiment of the invention, processors (222, 224) within the control module (216) are able to directly communicate using, for example, point-to-point interconnect such as Intel® QuickPath Interconnect. Those skilled in the art will appreciate that other point-to-point communication mechanisms may be used to permit direct communication between the processor (222, 224) without departing from the invention.

Continuing with FIG. 2B, in one embodiment of the invention, the control module (216) is substantially similar to the control module (200) in FIG. 2A. In one embodiment of the invention, the switch fabric (234) is substantially similar to the switch fabric (206) in FIG. 2A. In one embodiment of the invention, each processor (222, 224) is substantially similar to the processor (208) in FIG. 2A. In one embodiment of the invention, the memory (226, 228) is substantially similar to the memory (210) in FIG. 2A. In one embodiment of the invention, the IOMs (218, 220) are substantially similar to the IOM (204) in FIG. 2A. In one embodiment of the invention, the FPGAs (230, 232) are substantially similar to the FPGA (212) in FIG. 2A. Finally, the storage module groups (236, 238) are substantially similar to the storage module group (202) in FIG. 2A.

In one embodiment of the invention, the two IOMs (218, 220) in the control module (216) double the I/O bandwidth for the control module (216) (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment of the invention, the use of the switch fabric (234) to handle communication between the various connected components (described above) allows each of the processors (222, 224) to directly access (via the switch fabric (234)) all FPGAs (230, 232) and all storage modules (236A, 236N, 238A, 238N) connected to the switch fabric (234).

Figure 2C:
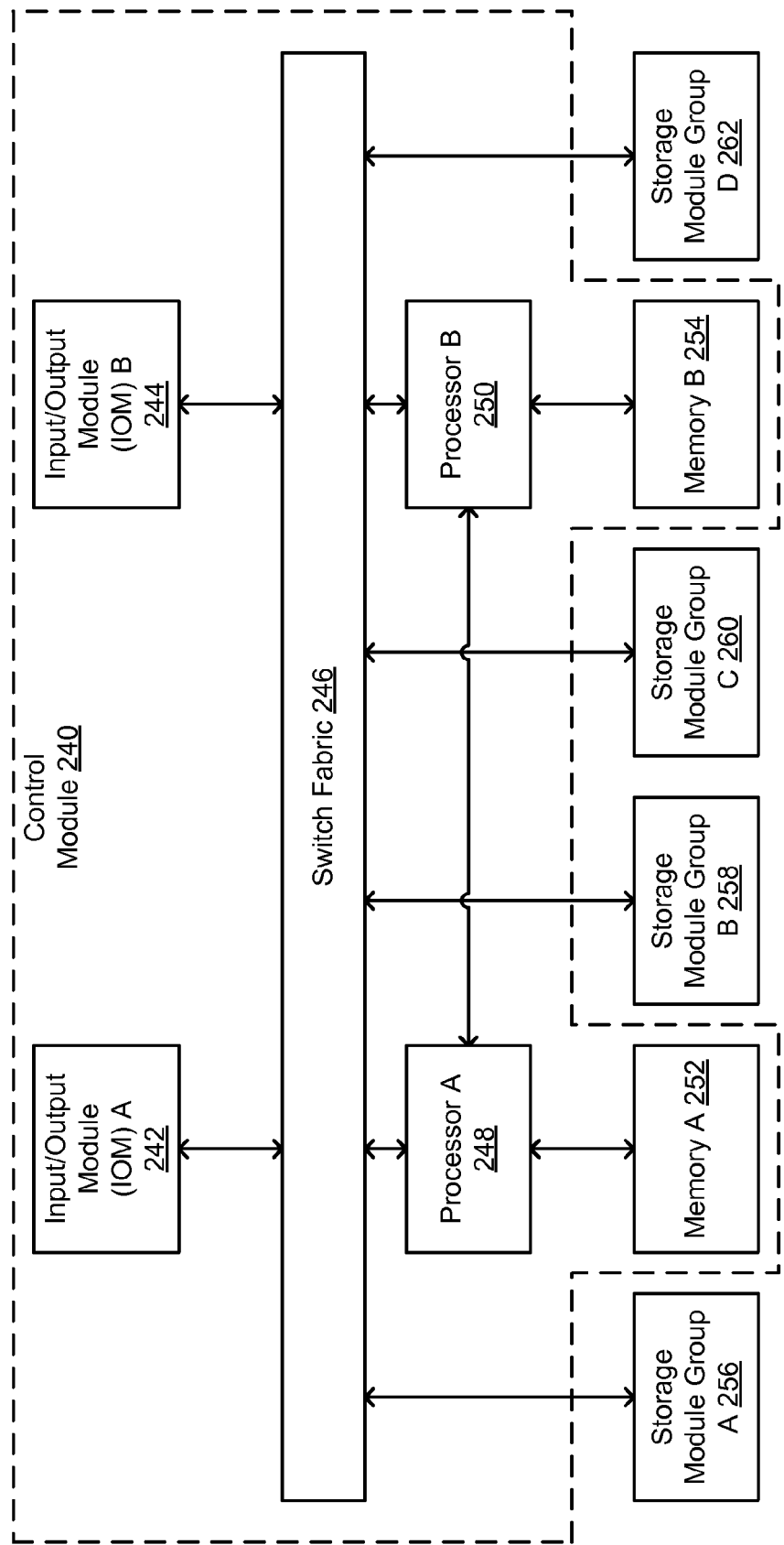

Referring to FIG. 2C, FIG. 2C shows a storage appliance that includes a control module (240) connected (via a switch fabric (246)) to multiple storage modules (not shown) in the storage module groups (256, 258, 260, 262). As shown in FIG. 2C, the control module (240) includes two IOMs (242, 244), two processors (248, 250), and memory (252, 254). In one embodiment of the invention, all components in the control module (240) communicate via the switch fabric (246). In addition, the processors (248, 250) may communicate with each other using the switch fabric (246) or a direct connection (as shown in FIG. 2C). In one embodiment of the invention, the processors (248, 250) within the control module (240) are able to directly communicate using, for example, a point-to-point interconnect such as Intel® QuickPath Interconnect. Those skilled in the art will appreciate that other point-topoint communication mechanisms may be used to permit direct communication between the processors (248, 250) without departing from the invention.

In one embodiment of the invention, processor A (248) is configured to primarily handle requests related to the storage and retrieval of data from storage module groups A and B (256, 258) while processor B (250) is configured to primarily handle requests related to the storage and retrieval of data from storage module groups C and D (260, 262). However, the processors (248, 250) are configured to communicate (via the switch fabric (246)) with all of the storage module groups (256, 258, 260, 262). This configuration enables the control module (240) to spread the processing of I/O requests between the processors and/or provides built-in redundancy to handle the scenario in which one of the processors fails.

Continuing with FIG. 2C, in one embodiment of the invention, the control module (240) is substantially similar to the control module (200) in FIG. 2A. In one embodiment of the invention, the switch fabric (246) is substantially similar to the switch fabric (206) in FIG. 2A. In one embodiment of the invention, each processor (248, 250) is substantially similar to the processor (208) in FIG. 2A. In one embodiment of the invention, the memory (252, 254) is substantially similar to the memory (210) in FIG. 2A. In one embodiment of the invention, the IOMs (242, 244) are substantially similar to the IOM (204) in FIG. 2A. Finally, the storage module groups (256, 258, 260, 262) are substantially similar to the storage module group (202) in FIG. 2A.

Figure 2D:
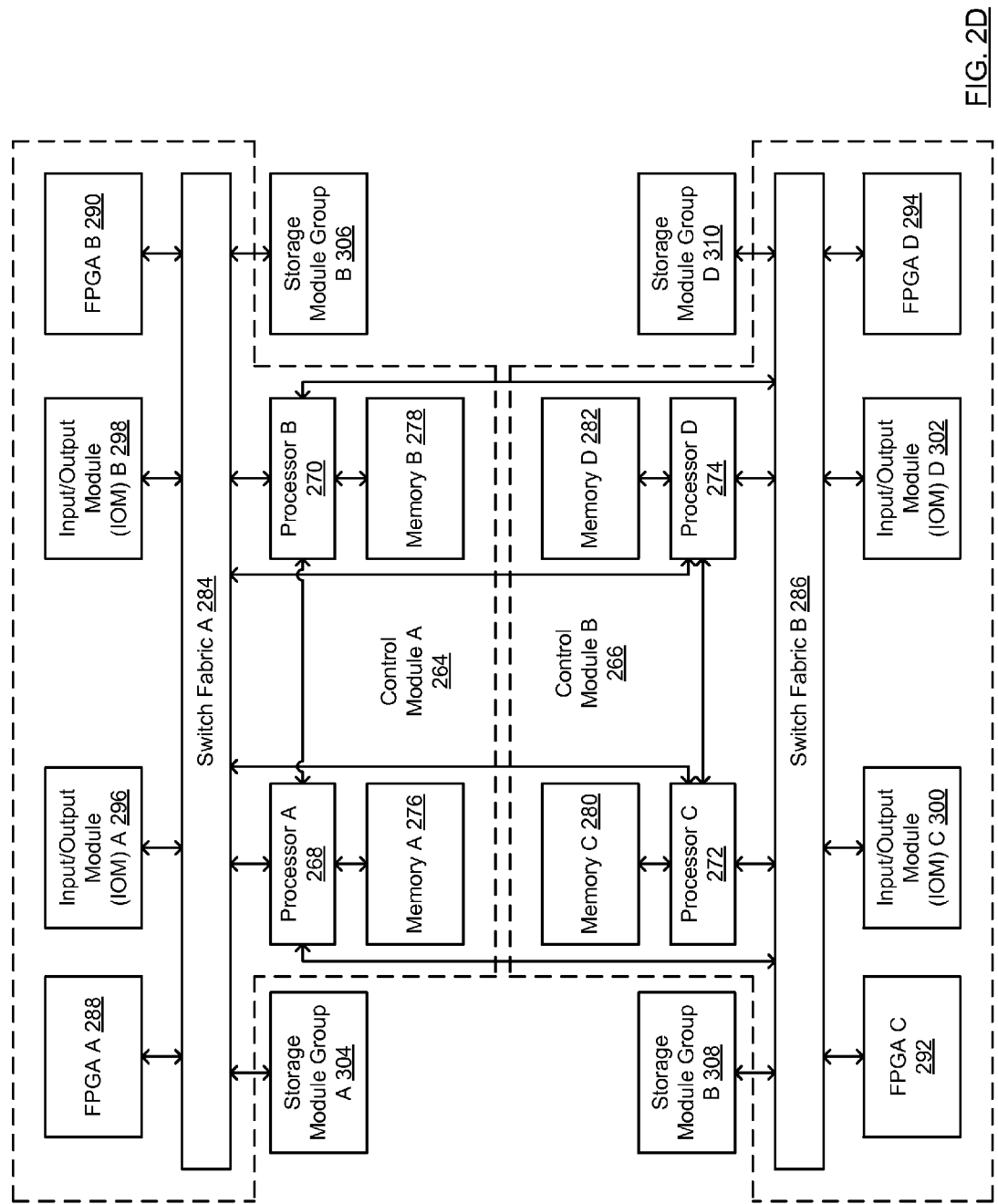

Referring to FIG. 2D, FIG. 2D shows a storage appliance that includes two control modules (264, 266). Each control module includes IOMs (296, 298, 300, 302), processors (268, 270, 272, 274), memory (276, 278, 280, 282), and FPGAs (if present) (288, 290, 292, 294). Each of the control modules (264, 266) includes a switch fabric (284, 286) through which components within the control modules communicate.

In one embodiment of the invention, processors (268, 270, 272, 274) within a control module may directly communicate with each other using, for example, a point-to-point interconnect such as Intel® QuickPath Interconnect. Those skilled in the art will appreciate that other point-to-point communication mechanisms may be used to permit direct communication between the processors (268, 270, 272, 274) without departing from the invention. In addition, processors (268, 270) in control module A may communicate with components in control module B via a direct connection to the switch fabric (286) in control module B. Similarly, processors (272, 274) in control module B may communicate with components in control module A via a direct connection to the switch fabric (284) in control module A.

In one embodiment of the invention, each of the control modules is connected to various storage modules (denoted by storage module groups (304, 306, 308, 310)). As shown in FIG. 2D, each control module may communicate with storage modules connected to the switch fabric in the control module. Further, processors in control module A (264) may communicate with storage modules connected to control module B (266) using switch fabric B (286). Similarly, processors in control module B (266) may communicate with storage modules connected to control module A (264) using switch fabric A (284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

With respect to FIGS. 2B-2D, in one or more embodiments of the invention, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

Those skilled in the art will appreciate that while FIGS. 2A-2D show control modules connected to a limited number of storage modules, the control module may be connected to any number of storage modules without departing from the invention. Those skilled in the art will appreciate that while FIGS. 2A-2D show various configurations of the storage appliance, the storage appliance may be implemented using other configurations without departing from the invention.

FIG. 3 shows a storage module in accordance with one or more embodiments of the invention. The storage module (320) includes a storage module controller (322), memory (324), and one or more solid state memory modules (330A, 330N). Each of these components is described below.

In one embodiment of the invention, the storage module controller (322) is configured to receive requests to read from and/or write data to one or more control modules. Further, the storage module controller (322) is configured to service the read and write requests using the memory (324) and/or the solid state memory modules (330A, 330N). Though not shown in FIG. 3, the storage module controller (322) may include a DMA engine, where the DMA engine is configured to read data from the memory (324) or from one of the solid state memory modules (330A, 330N) and write a copy of the data to a physical address in client memory (114 in FIG. 1D). Further, the DMA engine may be configured to write data from the memory (324) to one or more of the solid state memory modules. In one embodiment of the invention, the DMA engine is configured to be programmed by the processor (e.g., 208 in FIG. 2A). Those skilled in the art will appreciate that the storage module may include a DMA engine that is external to the storage module controller without departing from the invention.

In one embodiment of the invention, the memory (324) corresponds to any volatile memory including, but not limited to, Dynamic Random-Access Memory (DRAM), Synchronous DRAM, SDR SDRAM, and DDR SDRAM.

In one embodiment of the invention, the memory (324) may be logically or physically partitioned into vaulted memory (326) and cache (328). In one embodiment of the invention, the storage module controller (322) is configured to write out the entire contents of the vaulted memory (326) to one or more of the solid state memory modules (330A, 330N) in the event of notification of a power failure (or another event in which the storage module may lose power) in the storage module. In one embodiment of the invention, the storage module controller (322) is configured to write the entire contents of the vaulted memory (326) to one or more of the solid state memory modules (330A, 330N) between the time of the notification of the power failure and the actual loss of power to the storage module. In contrast, the content of the cache (328) is lost in the event of a power failure (or another event in which the storage module may lose power).

In one embodiment of the invention, the solid state memory modules correspond to any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

In one embodiment of the invention, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space.

In one embodiment of the invention, a unified address space is created, in part, by the non-transparent bridge in the client switch which allows the processor in the control module to "see" a portion of the client memory. Accordingly, the processor in the control module may perform read and/or write requests in the portion of the client memory that it can "see".

Figure 4:
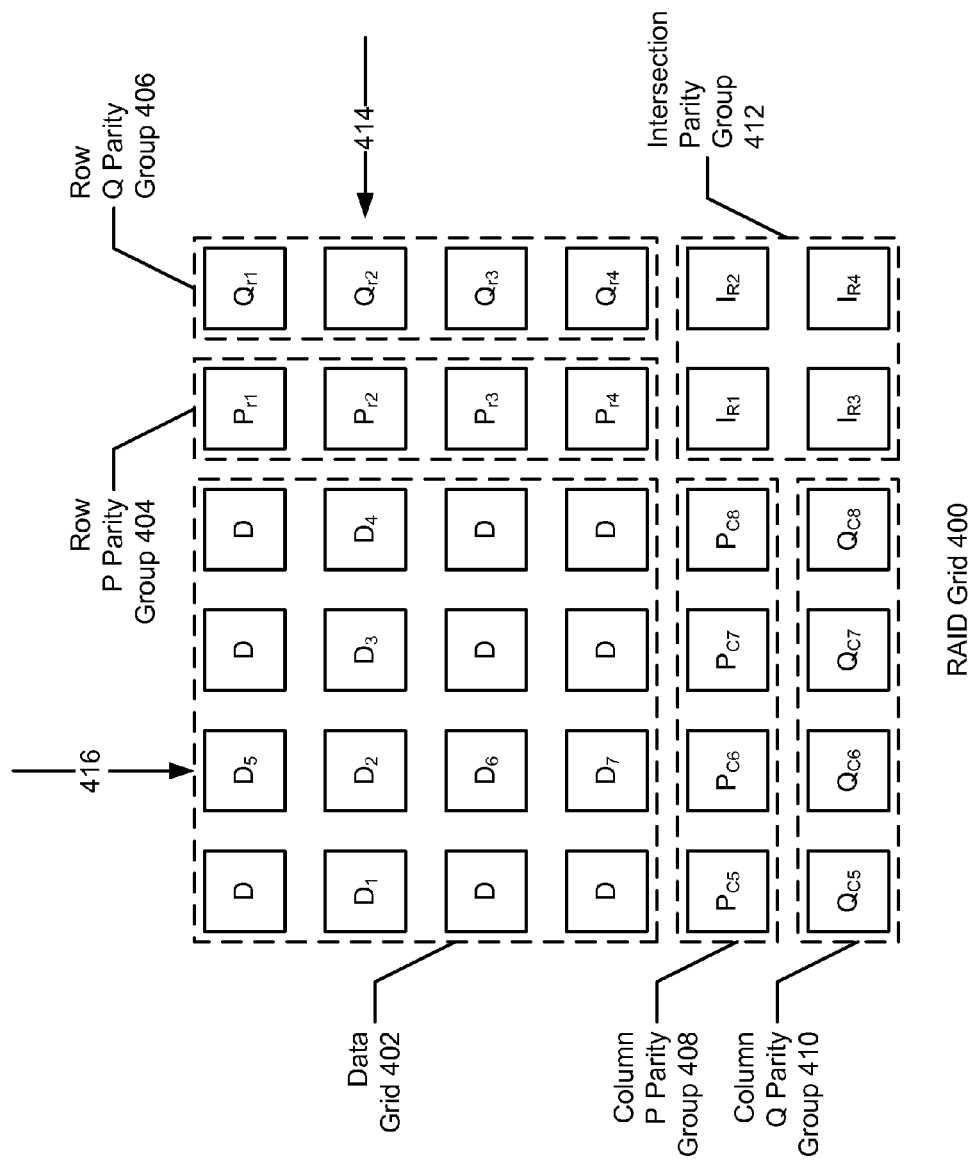
FIG. 4 shows a RAID grid in accordance with one embodiment of the invention.

FIG. 4 shows a RAID grid in accordance with one embodiment of the invention. In one embodiment of the invention, if the processor (see e.g., FIG. 2A) implements a 2D RAID scheme or a 3D RAID scheme (see FIG. 5), the processor stores data in a RAID Grid (400). FIG. 4 shows the conceptual portions of a RAID grid in accordance with one or more embodiments of the invention. The RAID grid (400) includes a number of RAID grid locations, where each RAID grid location is ultimately written to a unique physical address in the appropriate storage module. The RAID grid (400) includes (i) a data grid (402), which includes RAID grid locations that store data received from the client (i.e., data that the client has instructed the RAID controller to write to the storage module; (ii) a row P parity group (404), which includes the RAID grid locations that store in the P parity values calculated using data in RAID grid locations in a row (described below); (iii) a row Q parity group (406), which includes the RAID grid locations that store in the Q parity values calculated using data in RAID grid locations in a row (described below); (iv) a column P parity group (408), which includes the RAID grid locations that store in the P parity values calculated using data in RAID grid locations in a column (described below); (v) a column Q parity group (410), which includes the RAID grid locations that store in the Q parity values calculated using data in RAID grid locations in a column (described below); and (vi) an intersection parity group (412), which includes parity values calculated using (a) data from RAID grid locations in row P parity group (404), (b) data from RAID grid locations in row Q parity group (406), (c) data from RAID grid locations in column P parity group (408), and (d) data from RAID grid locations in column Q parity group (410) (described below).

Referring to row (414), in one embodiment of the invention, the data stored in RAID grid location denoted as $P_r$ in row (414) is calculated by applying a P parity function to all RAID grid locations in the row (414) that includes data (e.g., $P_r = f_P (D_1, D_2, D_3, D_4)$. Similarly, in one embodiment of the invention, the data stored in RAID grid location denoted as $Q_r$ in row (414) is calculated by applying a Q parity function to all RAID grid locations in the row (414) that includes data (e.g., $Q_r = f_Q (D_1, D_2, D_3, D_4)$.

Referring to column (416), in one embodiment of the invention, data stored in the RAID grid location denoted as $P_c$ in column (416) is calculated by applying a P parity function to all RAID grid locations in the column (416) that includes data (e.g., $P_C = f_P (D_5, D_2, D_6, D_7)$. Similarly, in one embodiment of the invention, data stored in the RAID grid location denotes by $Q_C$ in column (416) is calculated by applying a Q parity function to all RAID grid locations in the column (416) that includes data (e.g., $Q_C = f_Q (D_5, D_2, D_6, D_7)$.

Referring to the intersection parity group (412), in one embodiment of the invention, the data stored in the RAID grid location denoted as $I_{r1}$ may be calculated by applying a P parity function to all RAID grid locations in the row P Parity Group (404) or by applying a P parity function to all RAID grid locations in the column P Parity Group (408). For example, $I_{r1} = f_P (P_{r1}, P_{r2}, P_{r3}, P_{r4})$ or $I_{r1} = f_P (P_{c5}, P_{c6}, P_{c7}, P_{c8})$.

In one embodiment of the invention, the data stored in the RAID grid location denoted as $I_{r2}$ may be calculated by applying a P parity function to all RAID grid locations in the row Q Parity Group (404) or by applying a Q parity function to all RAID grid locations in the column P Parity Group (408). For example, $I_{r2} = f_P (Q_{r1}, Q_{r2}, Q_{r3}, Q_{r4})$ or $I_{r2} = f_Q (P_{c5}, P_{c6}, P_{c7}, P_{c8})$.

In one embodiment of the invention, the data stored in the RAID grid location denoted as $I_{r3}$ may be calculated by applying a P parity function to all RAID grid locations in the column Q Parity Group (410) or by applying a Q parity function to all RAID grid locations in the row P Parity Group (404). For example, $I_{r3} = f_P (Q_{c5}, Q_{c6}, Q_{c7}, Q_{c8})$ or $I_{r3} = f_Q (P_{c1}, P_{c2}, P_{c3}, P_{c4})$.

In one embodiment of the invention, the data stored in the RAID grid location denoted as $I_{r4}$ may be calculated by applying a Q parity function to all RAID grid locations in the column Q Parity Group (410) or by applying a Q parity function to all RAID grid locations in the row Q Parity Group (406). For example, $I_{r4} = f_Q (Q_{c1}, Q_{c2}, Q_{c3}, Q_{c4})$ or $I_{r4} = f_Q (Q_{c5}, Q_{c6}, Q_{c7}, Q_{c8})$.

In one embodiment of the invention, the P and Q parity functions used to calculate the values for all of parity groups may correspond to any P and Q parity functions used to implement RAID 6.

As discussed above, the RAID grid (400) shown in FIG. 4 represents the conceptual layout of a RAID grid. However, when the individual RAID grid locations are written to the storage module(s), the relative location of the various RAID grid locations may vary across a row and or a column. For example, referring to row (414), when the RAID grid locations within row (414) are written to the storage module(s), the relative location of RAID grid locations that include data (denoted by "D") and the RAID grid locations that include parity data (i.e., the RAID grid locations denoted as "$P_r$" and "$Q_r$") may be as follows: $<D_1, D_2 P_{r2}, D_3 Q_{r2}, D_4>$, $<P_{r2}, Q_{r2}, D_1, D_2, D_3, D_4>$, or any other arrangement within row (414). Similarly, referring to column (416), the relative location of RAID grid locations that include data (denoted by "D") and the RAID grid locations that include parity data (i.e., the RAID grid locations denoted as "$P_c$" and "$Q_c$") may be as follows: $<D_5, D_2, D_6, P_{c6}, D_6, Q_{c6}>$, $<P_{c6}, D_5, D_2, Q_{c6}, D_6, D_7>$, or any other arrangement within column (416).

The processor (or another entity in the system) may determine to which physical addresses in the storage module each of the RAID grid locations is written. This determination may be made prior to receiving any of the data (denoted as "D") for a particular RAID grid from the client. Alternatively, the determination may be made prior to writing the RAID grid locations to the storage module.

Those skilled in the art will appreciate that while FIG. 4 shows a RAID grid that is 6×6, the RAID grid may be implemented using any other dimensions without departing from the invention.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g^0 \cdot D_0 + g^1 \cdot D_1 + g^2 \cdot D_2 + \ldots + g^{n-1} \cdot D_{n-1}$, where Q corresponds any one of the Q parity values defined with respect to FIG. 4, g is a generator of the field, and the value of D corresponds to the data (which may include both values from the data grid and/or values from one or more rows or columns that include P or Q parity values).

Those skilled in the art will appreciate that while the RAID grid in FIG. 4 includes P and Q parity for each row and column, embodiments of the invention may be implemented using greater or fewer parity values without departing from the invention. For example, each row and column may only include a P parity value. In another example, each row and column may include three parity values. The aforementioned examples are not intended to limit the invention. In one embodiment of the invention, regardless of the number of parity values used in the implementation of the invention, each of the parity values is a Reed-Solomon syndrome.

Figure 5:
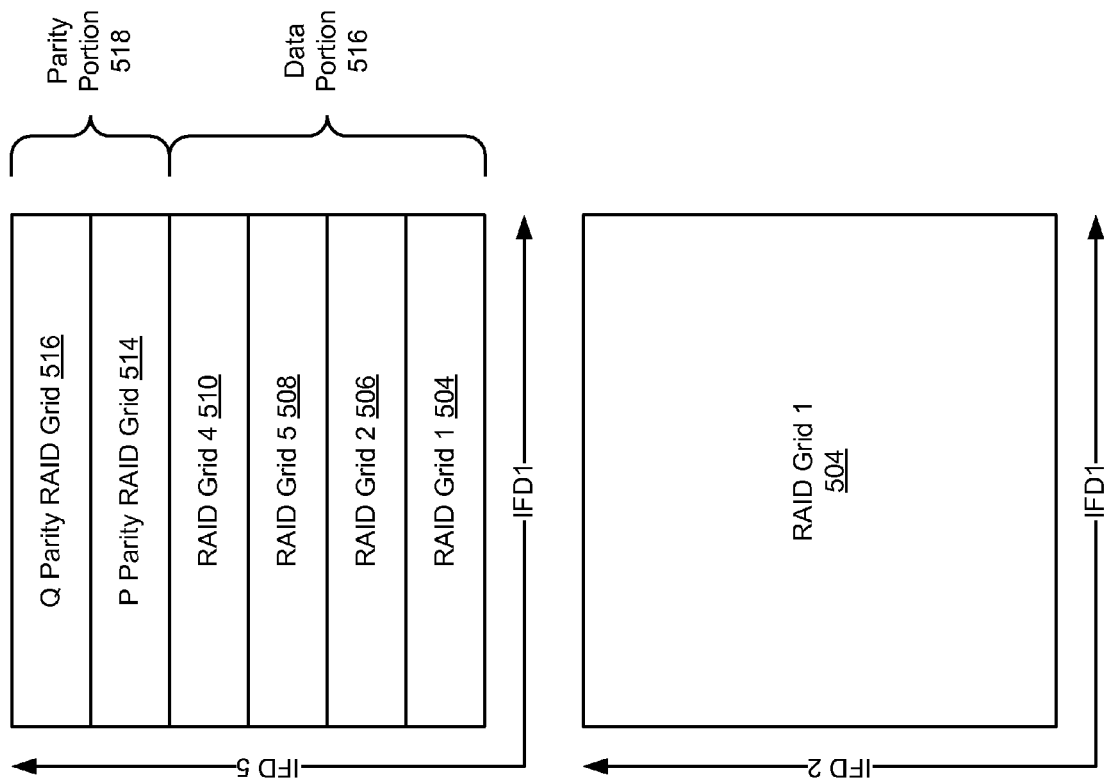
FIG. 5 shows a RAID cube and various views of the RAID cube in accordance with one embodiment of the invention.
Figure 5:
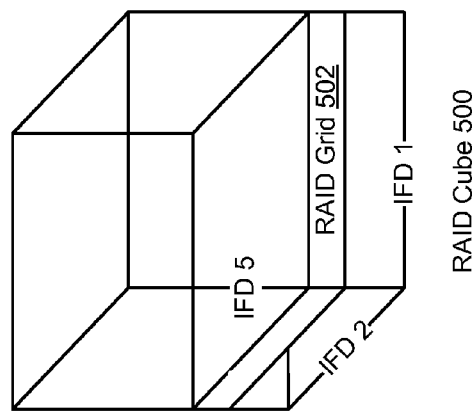

FIG. 5 shows a RAID cube and various views of the RAID cube in accordance with one embodiment of the invention. As shown in FIG. 5, a RAID cube (500) corresponds to a conceptual stack of RAID grids (502). As discussed above, the processor (or another entity in the system) selects the physical addresses within the storage module in which to store the data for each of the RAID grid locations. In one embodiment of the invention, the selection of the physical addresses may be determined in accordance with the IFDs for which the RAID grid (or RAID cube) is designed to protect against. Said another way, the physical addresses may be selected in a manner to protect against failures in one or more IFDs. For example, as shown in FIG. 5, each RAID grid location (not shown) for a given RAID grid (502, 504) is written to a physical address (or will be written to a physical address) in a storage module (not shown) that is selected using a unique pair of values from IFD 1 and IFD 2, but has the same value for IFD 3. For example, if the data in the storage module is stored in NAND flash, where the NAND flash is part of a storage module (which includes multiple NAND dies), then the IFDs may be as follows: (i) IFD 1=storage module, (ii) IFD 2=channel, and (iii) IFD 3=NAND die. Accordingly, in a given RAID grid, the data in each RAID grid location is written to a unique combination of storage module (IFD 1) and channel (IFD 2) but is written to the same NAND die (on each of the storage modules). Those skilled in the art will appreciate that the invention is not limited to the three independent fault domains described above. Further, those skilled in the art will appreciate that the invention is not limited to a storage module that includes NAND flash.

Continuing with FIG. 5, as discussed above, the RAID cube (500) is conceptual stack of RAID grids. More specifically, in one embodiment of the invention, the RAID cube (500) may include (i) a data portion (516), which includes two or more RAID grids (504, 506, 508, 510) (see FIG. 4) and a parity portion (518) that includes a P parity RAID grid (512) and a Q parity RAID grid (514).

In one embodiment of the invention, the RAID grids (504, 506, 508, 510) in the data portion (516) include parity data (see FIG. 4), which allows data within the RAID grid to be recovered using only data (including parity data) within the RAID grid. In one embodiment of the invention, the RAID cube is arranged such that data for a given RAID grid location in a given RAID grid (504, 506, 508, 510) may be recovered using data (including parity data) from other RAID grids (in both the data portion (516) and the parity portion (518). In one embodiment of the invention, the parity portion (518) of the RAID cube enables such a recovery mechanism.

In one embodiment of the invention, the P parity RAID grid (512) is the same dimension as the underlying RAID grids (504, 506, 508, 510), where the data in every RAID grid location within the P Parity RAID grid is calculated by applying a P parity function (e.g., an XOR function) to data (including parity data) from the RAID grids in the data portion (516). Similarly, the Q parity RAID grid (514) is the same dimension as the underlying RAID grids (504, 506, 508, 510), where the data in every RAID grid location within the Q Parity RAID grid is calculated by applying a Q parity function to data (including parity data) from the RAID grids in the data portion (516).

Figure 6:
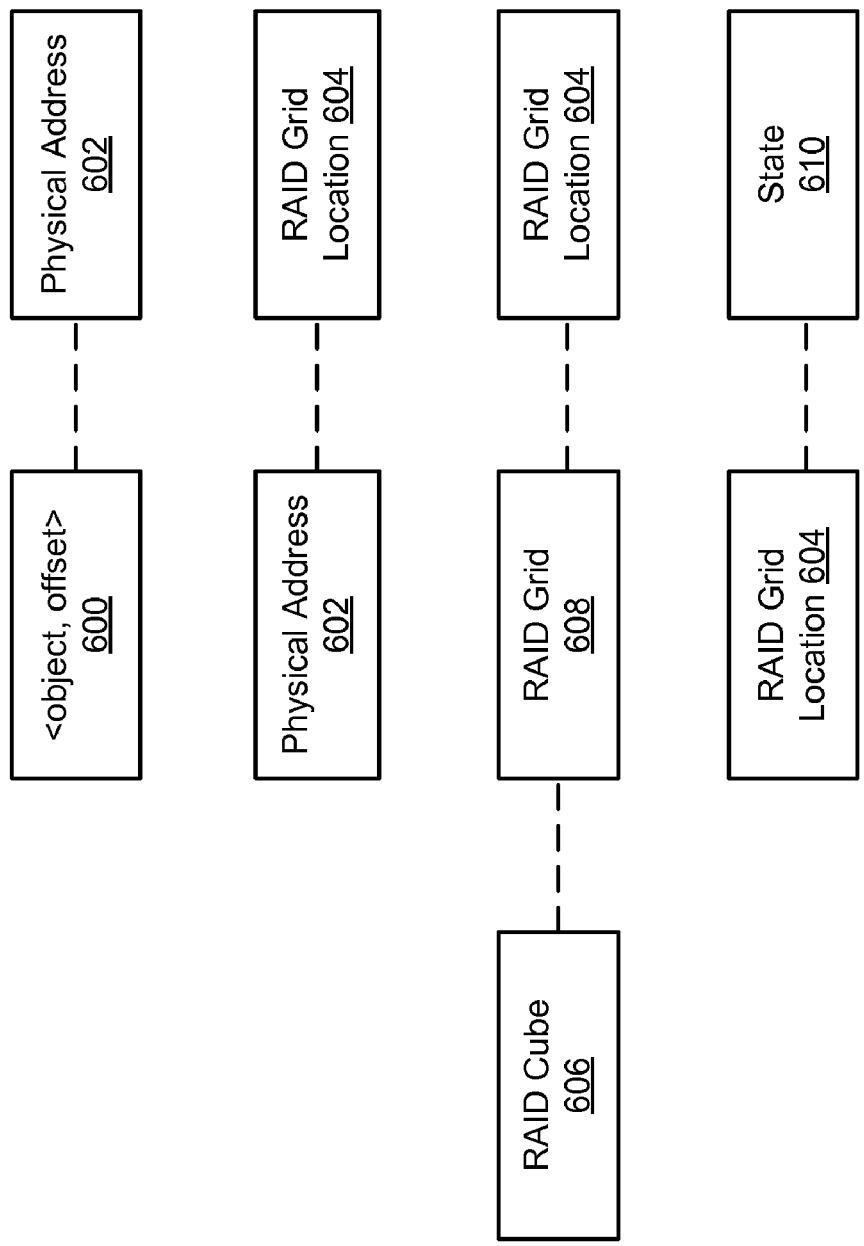
FIG. 6 shows data structures in accordance with one embodiment of the invention.

FIG. 6 shows data structures in accordance with one embodiment of the invention. In one embodiment of the invention, the memory (e.g., 210 in FIG. 2A) includes one or more data structures to implement the multi-dimensional RAID schemes.

In one embodiment of the invention, the memory includes a data structure that tracks the mappings between data provided by the client and the physical address of such data in a storage module. In one embodiment of the invention, the memory tracks the aforementioned information using a mapping between <object, offset> (600), which identifies the data from the perspective of the client, and physical address (602), which identifies the location of the data within the storage module. In one embodiment of the invention, the mapping may be between a hash value derived from applying a hash function (e.g., MD5, SHA 1) to <object, offset>.

In one embodiment of the invention, the memory includes a data structure that tracks how each RAID grid location (604) is mapped to a particular physical address (602) in a storage module.

In one embodiment of the invention, the memory includes a data structure that tracks which RAID grid (including RAID grids in the data portion and the parity portion) (608) is associated with which RAID cube (606) (assuming that the processor is implementing a 3D RAID scheme) and also which RAID grid locations (604) are associated with each RAID grid (608).

In one embodiment of the invention, the memory includes a data structure that tracks the state (610) of each RAID grid location (604). In one embodiment of the invention, the state (610) of a RAID grid location may be set as filled (denoting that data (or parity data) has been written to the RAID grid location) or empty (denoting that no data (or parity data) has been written to the RAID grid location). In one embodiment of the invention, the processor may set the state of the RAID grid location to filled if the processor has identified data in the memory to write to the RAID grid location.

In one embodiment of the invention, the memory includes a data structure that tracks the RAID grid geometry. In one embodiment of the invention, the RAID grid geometry may include, but is not limited to, the size of RAID grid and the IFD associated with each dimension of the RAID grid. This data structure (or another data structure) may also track the size of the RAID cube and the IFD associated with each dimension of the RAID cube.

In one embodiment of the invention, the memory includes a data structure that tracks the location of each P and Q parity value (including parity values within the intersection parity group (see FIG. 2)) within each row and/or column within each RAID grid.

In one embodiment of the invention, the memory includes a data structure that tracks which RAID grid locations in the data portion of the RAID cube are used to calculate each of the P and Q parity values in the P Parity RAID grid and Q parity RAID grid, respectively.

Figure 7A:
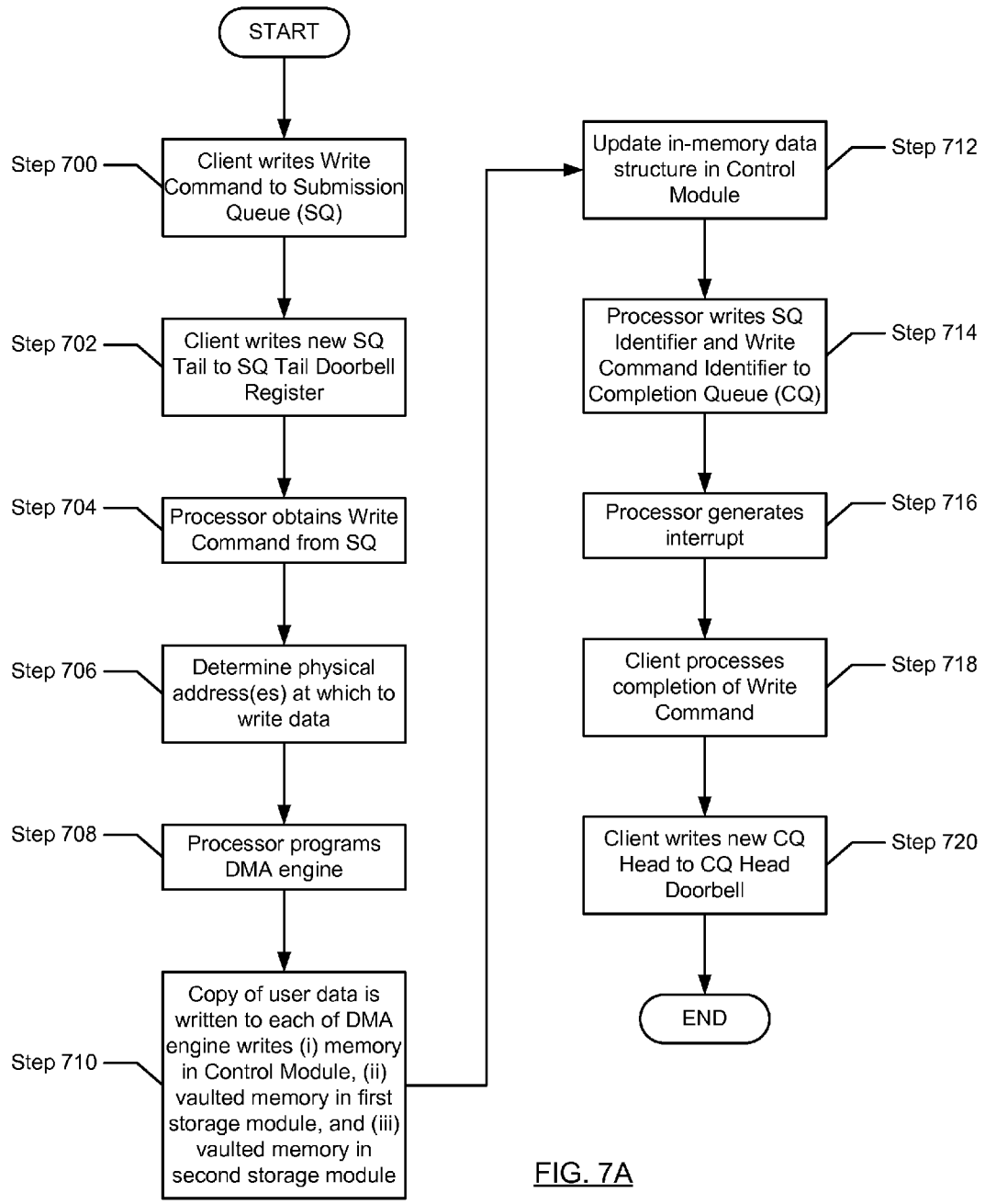
FIGS. 7A-7C show flowcharts in accordance with one or more embodiments of the invention.
Figure 7B:
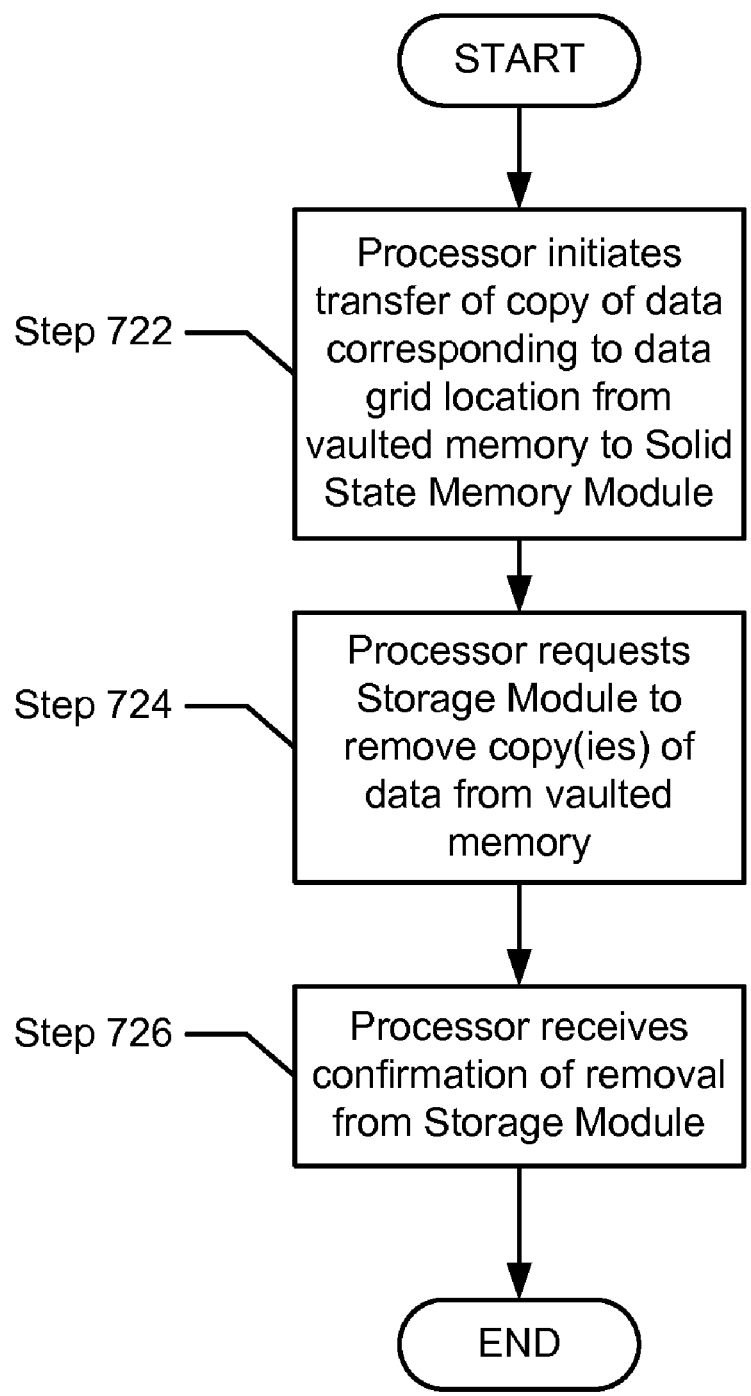
Figure 7C:
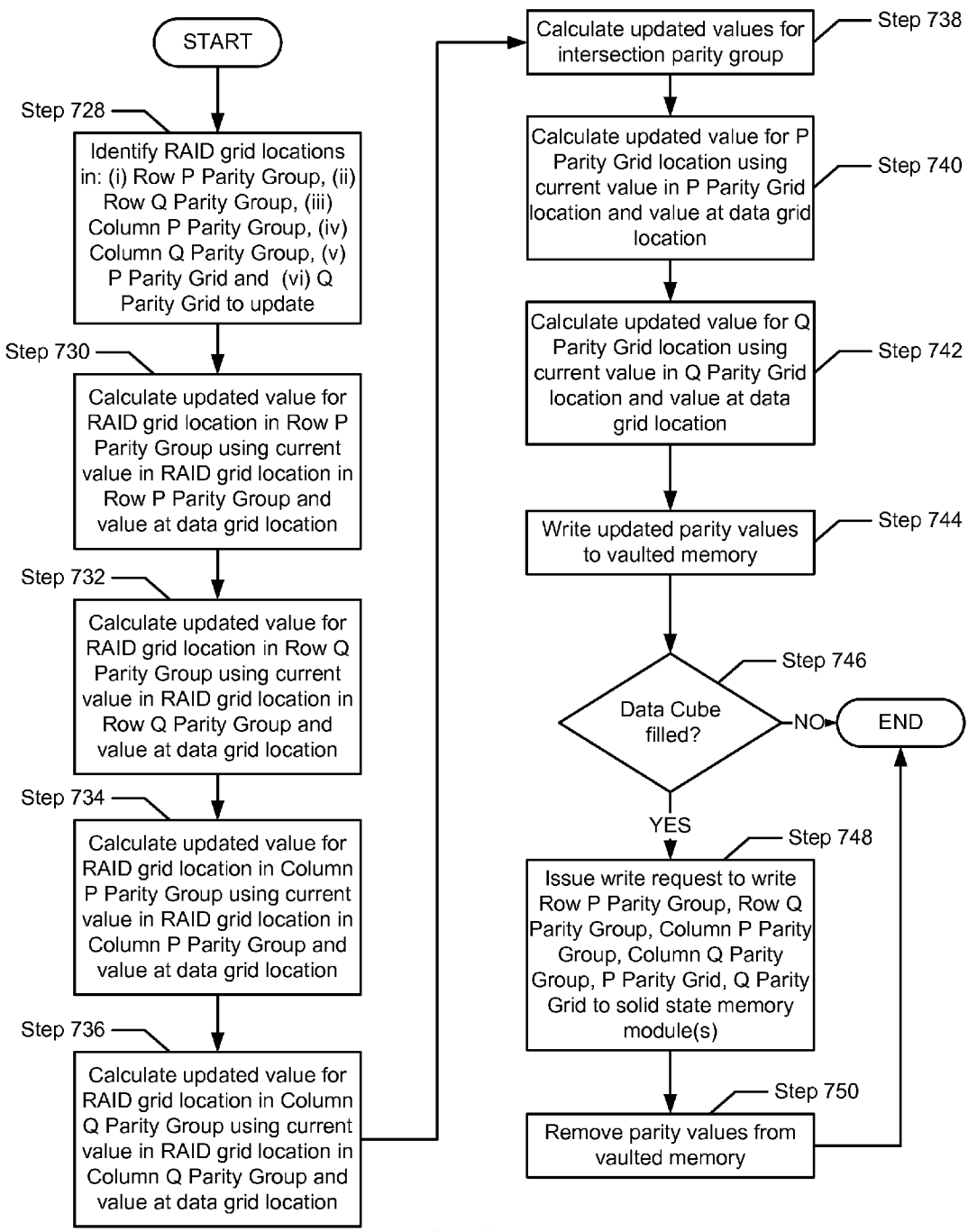

FIGS. 7A-7C show flowcharts in accordance with one or more embodiments of the invention. More specifically, FIGS. 7A-7C show a method for storing data in a storage appliance in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 7A may be performed in parallel with the steps shown in FIG. 7B and FIG. 7C. Further, the steps shown in FIG. 7B may be performed in parallel with the steps shown in FIG. 7C.

Referring to FIG. 7A, in step 700, the client writes a write command (write request) to the submission queue (SQ) of the processor in a control module (208 in FIG. 2A). In one embodiment of the invention, the write command specifies the logical address (which may also be referred to as a "source address") of the data in the client memory. In one embodiment of the invention, the write command passes through at least the client switch and the switch fabric prior to reaching the SQ.

In step 702, client writes a new SQ tail to the SQ Tail doorbell register. In one embodiment of the invention, by writing to the SQ Tail doorbell register, the client notifies the processor that there is a new command to process in its submission queue.

In step 704, the processor obtains the write command from the SQ. In step 706, the processor determines the physical address(es) in which to write the data. In one embodiment of the invention, the physical address(es) corresponds to a location in the solid state memory module. In one embodiment of the invention, the processor selects two physical addresses in which to write copies of the data, where each of the physical addresses is in a separate solid state memory module.

More specifically, in one embodiment of the invention, at least one of the physical addresses may be selected in the following manner: (i) select a physical address in which to write the data received from the client, where the physical address is associated with a RAID grid location in a data grid (e.g., data grid 402 in FIG. 4) and (ii) create a mapping between the <object, offset> for the data and the selected physical address. In one embodiment of the invention, at some point prior to selecting the physical address in which to write the data, the processor specifies (i) at least one RAID grid, (ii) RAID grid locations for the RAID grid, and (iii) the physical address in the storage module associated with each RAID grid location. In addition, the processor may initialize the state of each RAID grid location to empty.

Continuing with FIG. 7A, in step 708, the processor programs the DMA engine to issue a write to a multicast address. In one embodiment of the invention, the multicast address is associated with a multicast group, where the multicast group specifies a first memory location in the memory in the control module, a second memory location in a first vault memory, and a third memory location in a second vaulted memory. In one embodiment of the invention, the first vaulted memory is located in the same storage module as the solid state memory module that includes the physical address specified by the processor. In one embodiment of the invention, the second vaulted memory is determined in a similar manner. In one embodiment of the invention, there is one vaulted memory location selected for each physical address identified by the processor in step 706.

In step 710, the DMA engine reads the user data from the source address in client memory, and writes the data to the multicast address as directed by the control module. In one embodiment of the invention, a switch in the switch fabric is associated with the multicast address. Upon receipt of the address, the switch performs the necessary translation on the multicast address to obtain three addresses—one to each of the aforementioned memory locations. The switch subsequently sends copies of the user data to the three memory locations. Those skilled in the art will appreciate that the particular switch which implements the multicast functionality may vary based on the implementation of the switch fabric. In this embodiment, there is only one write issued between the client and the storage appliance.

In another embodiment of the invention, in Step 708, the processor programs the DMA engine to issue three write requests in parallel—one to each of the aforementioned memory locations. In this embodiment, in Step 710, the DMA engine issues the three write requests in parallel. In this embodiment, there are three writes issues between the client and the storage appliance.

Continuing with FIG. 7A, in step 712, the processor updates the in-memory data structure to reflect that three copies of the data are stored in the storage appliance. In step 714, the processor writes the SQ Identifier (which identifies the SQ of the processor) and a Write Command Identifier (which identifies the particular write command the client issued to the processor) to the completion queue (CQ) of the client.

In step 716, the processor generates an interrupt for the client processor. In one embodiment of the invention, the processor uses the doorbell interrupts provided by the non-transparent bridge to issue an interrupt to the client processor. In step 718, the client processes the data in its CQ. At this stage, the client has been notified that the write request has been serviced. In step 720, once the client has processed the data at the head of the completion queue, the client writes a new CQ head to the CQ head doorbell. This signifies to the processor, the next location in the CQ to use in future notifications to the client.

Referring to FIG. 7B, in Step 722, the processor in the control module initiates the writing of data from the vaulted memory to the physical address identified in step 706. In one embodiment of the invention, the processor in the control module programs a DMA engine in the storage module controller to read data from the vaulted memory and to write a copy of this data to a physical address in the solid state memory module.

In step 724, following step 722, the processor in the control module requests that all copies of the data in vaulted memory that correspond to the data written to the solid state memory module in step 722 are removed. In step 726, a confirmation of the removal is sent to the processor in the control module by each of the storage modules that included a copy of the data (written in step 710) in their respective vaulted memories.

Referring to FIG. 7C, FIG. 7C shows a method for maintaining and writing a RAID cube to the storage modules in accordance with one or more embodiments of the invention. More specifically, FIG. 7C shows a method for incrementally updating the various parity values in the RAID grid (or RAID cube) as data is written to RAID grid locations within the data grid(s). The initial values of all of the parity locations are set to zero (or another value that does not impact subsequent parity calculations as described below). In one embodiment of the invention, the process shown in FIG. 7C is performed each time data is written to a RAID grid location in a data grid. In one embodiment of the invention, FIG. 7C may be initiated once the data from the client is written to vaulted memory but prior to the data being written from the vaulted memory to a physical address in a solid state memory module.

In Step 728, the following RAID grid locations are identified: (i) RAID grid location in the Row P Parity group, (ii) RAID grid location in the Row Q Parity Group, (iii) RAID grid location in the Column P Parity group, (iv) RAID grid location in the Column Q Parity Group, (v) P Parity Grid and (vi) Q Parity Grid. The parity value in each of the aforementioned locations is required to be updated based on the newly written data to the RAID grid location in the data grid.

In Step 730, an updated value for the RAID grid location in the Row P Parity Group identified in Step 728 is calculated using the current value in the RAID grid location in Row P Parity Group and the value at data grid location (i.e., the new data that was written to a RAID grid location in the data grid). In Step 732, an updated value for the RAID grid location in the Row Q Parity Group identified in Step 728 is calculated using the current value in the RAID grid location in Row Q Parity Group and the value at data grid location (i.e., the new data that was written to a RAID grid location in the data grid).

In Step 734, an updated value for the RAID grid location in the Column P Parity Group identified in Step 728 is calculated using the current value in the RAID grid location in Column P Parity Group and the value at data grid location (i.e., the new data that was written to a RAID grid location in the data grid). In Step 736, an updated value for the RAID grid location in the Column Q Parity Group identified in Step 728 is calculated using the current value in the RAID grid location in Column Q Parity Group and the value at data grid location (i.e., the new data that was written to a RAID grid location in the data grid).

In Step 738, updated values for the RAID grid locations in the intersection group within the RAID grid in which the data was written are updated using the parity values calculated in Steps 730-736. In Step 740, updated values for all RAID grid locations in the P Parity RAID grid are calculated using at least one of the new data that was written to a RAID grid location in the data grid and the parity values calculated in Steps 730-736.

In Step 742, updated values for all RAID grid locations in the Q Parity RAID grid are calculated using at least one of the new data that was written to a RAID grid location in the data grid and the parity values calculated in Steps 730-736. In Step 744, the updated parity values calculated in Steps 730-742 are written to vaulted memory. Those skilled in the art will appreciate that the updated parity values may be written across one or more vaulted memories without departing from the invention.

In Step 746, a determination is made about whether the data cube is filled (i.e., data portion of the RAID cube is filled). If the data cube is filled, the process proceeds to Step 748; otherwise the process ends. In one embodiment of the invention, this determination is made using one or more of the data structures described with respect to FIG. 6.

In Step 748, parity values in RAID grid locations corresponding to the following are written to the solid state memory module(s): Row P Parity Group, Row Q Parity Group, Column P Parity Group, Column Q Parity Group, P Parity Grid, Q Parity Grid. In one embodiment of the invention, the physical addresses in which each of the aforementioned parity values is written is determined using one or more data structures described with respect to FIG. 6. In Step 750, copies of all parity values written to the solid state memory module(s) are removed from the vaulted memory. Those skilled in the art will appreciate that the parity values in a given RAID grid (excluding the P Parity RAID grid and the Q Parity RAID grid) may be written to the solid state storage module(s) once the data grid for the RAID grid is filled. Further, the P Parity RAID grid may be written to a solid state storage module(s) when final values (as opposed to intermediate values) for all RAID grid locations in the P Parity RAID grid have been calculated. Similarly, the Q Parity RAID grid may be written to a solid state storage module(s) when final values (as opposed to intermediate values) for all RAID grid locations in the Q Parity RAID grid have been calculated.

Those skilled in the art will appreciate that the system may execute multiple instances of all of the aforementioned steps in FIGS. 7A-7C concurrently.

FIGS. 8A-8I show an example of storing data in a storage appliance in accordance with one or more embodiments of the invention. The example is not intended to limit the scope of the invention. Further, various components in the client and storage appliance have been omitted for purposes of clarity in the FIGS. 8A-8I.

Figure 8A:
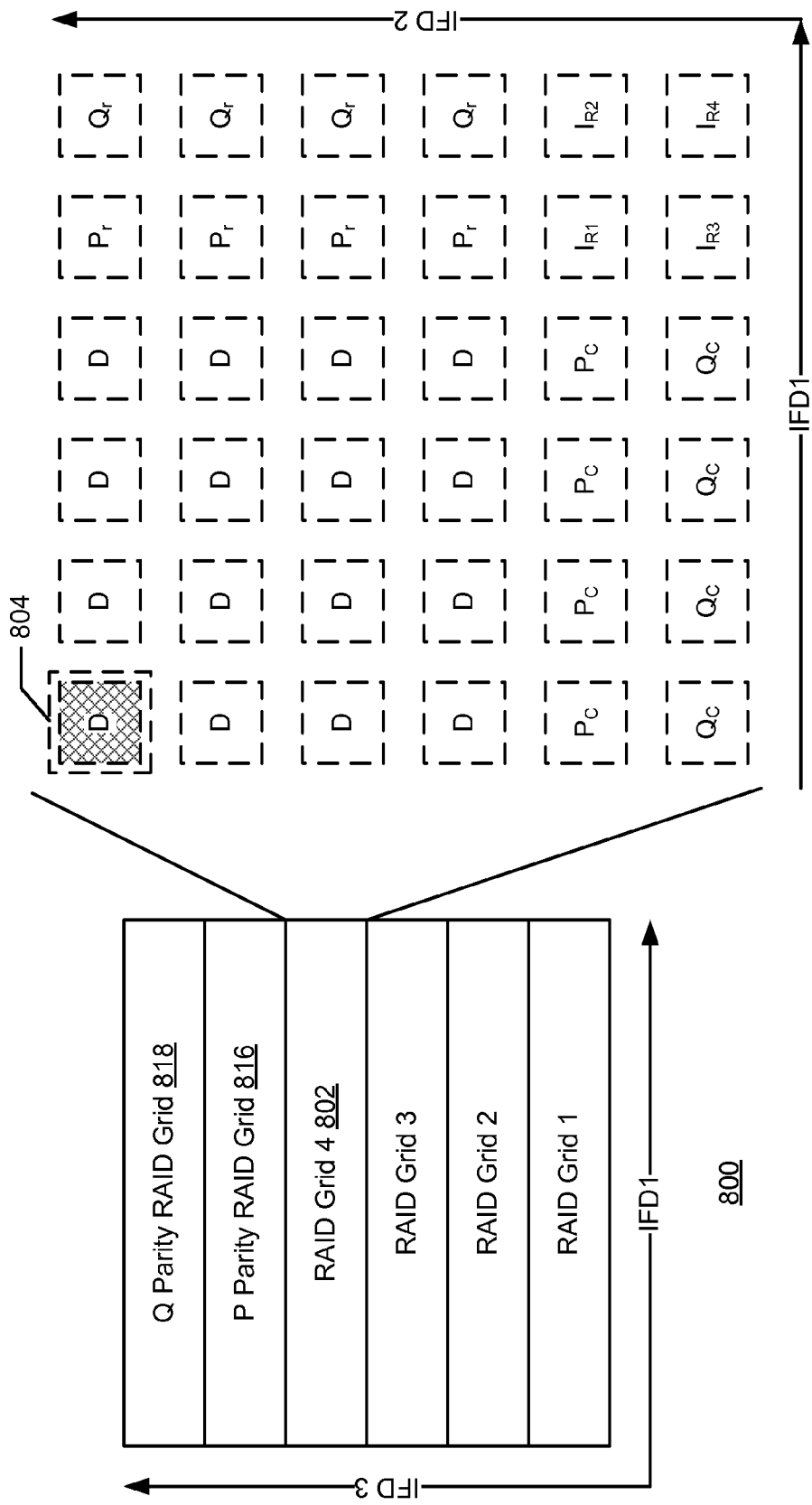
FIGS. 8A-8I show examples in accordance with one or more embodiments of the invention.

Referring to FIG. 8A, consider the scenario in which data is stored using a RAID cube (800) that includes a number of RAID grids including: RAID Grid 4 (802), P Parity RAID grid (816), and Q Parity RAID grid (818). Further, assume that data from the client (denoted as D) is written to a physical address in a solid state memory module that is mapped to a RAID grid location (804) in RAID grid 4 (802). As discussed above, the writing of data to a data grid within a RAID grid triggers the process described in FIG. 7C. In one embodiment of the invention, data considered to be written to the RAID grid when at least the data is stored in vaulted memory and is to be written to a physical address that is mapped to a RAID grid location.

Figure 8B:
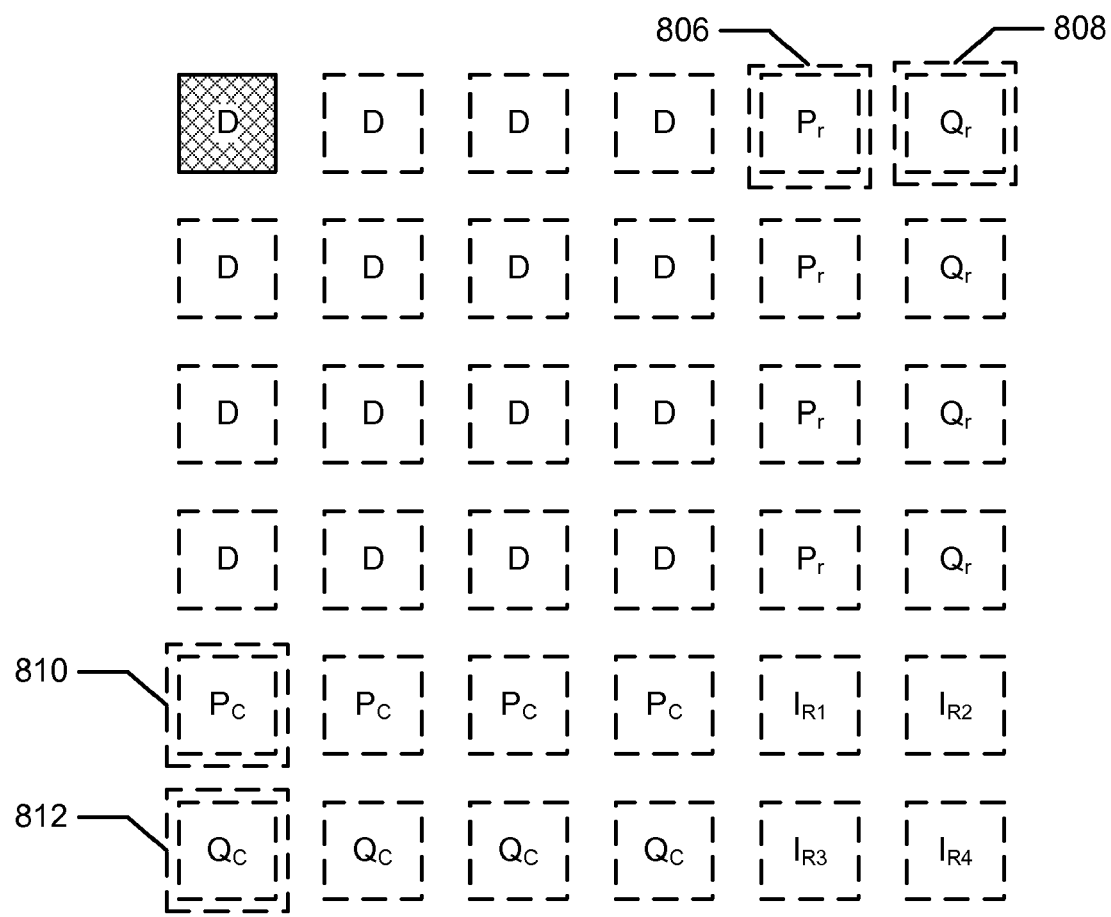

Referring to FIG. 8B, the RAID grid locations to be updated in the (i) Row P Parity Group (806), (ii) Row Q Parity Group (808), (iii) Column P Parity Group (810), (iv) Column Q Parity Group (812), (v) the P Parity Grid, and (vi) the Q Parity Grid are identified. More specifically, as described above, the identified RAID grid locations include parity values that need to be updated in response to the writing of the data in RAID grid location (804).

Figure 8C:
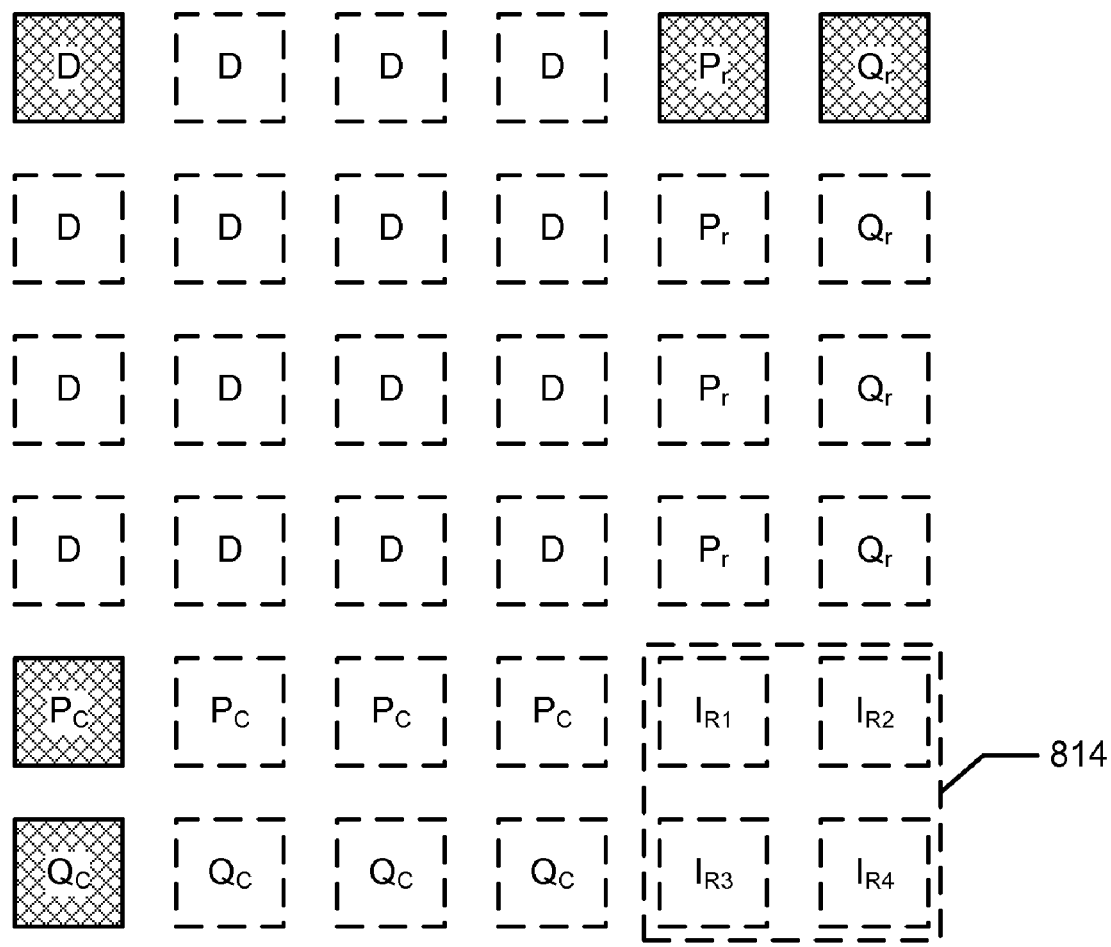
Figure 8D:
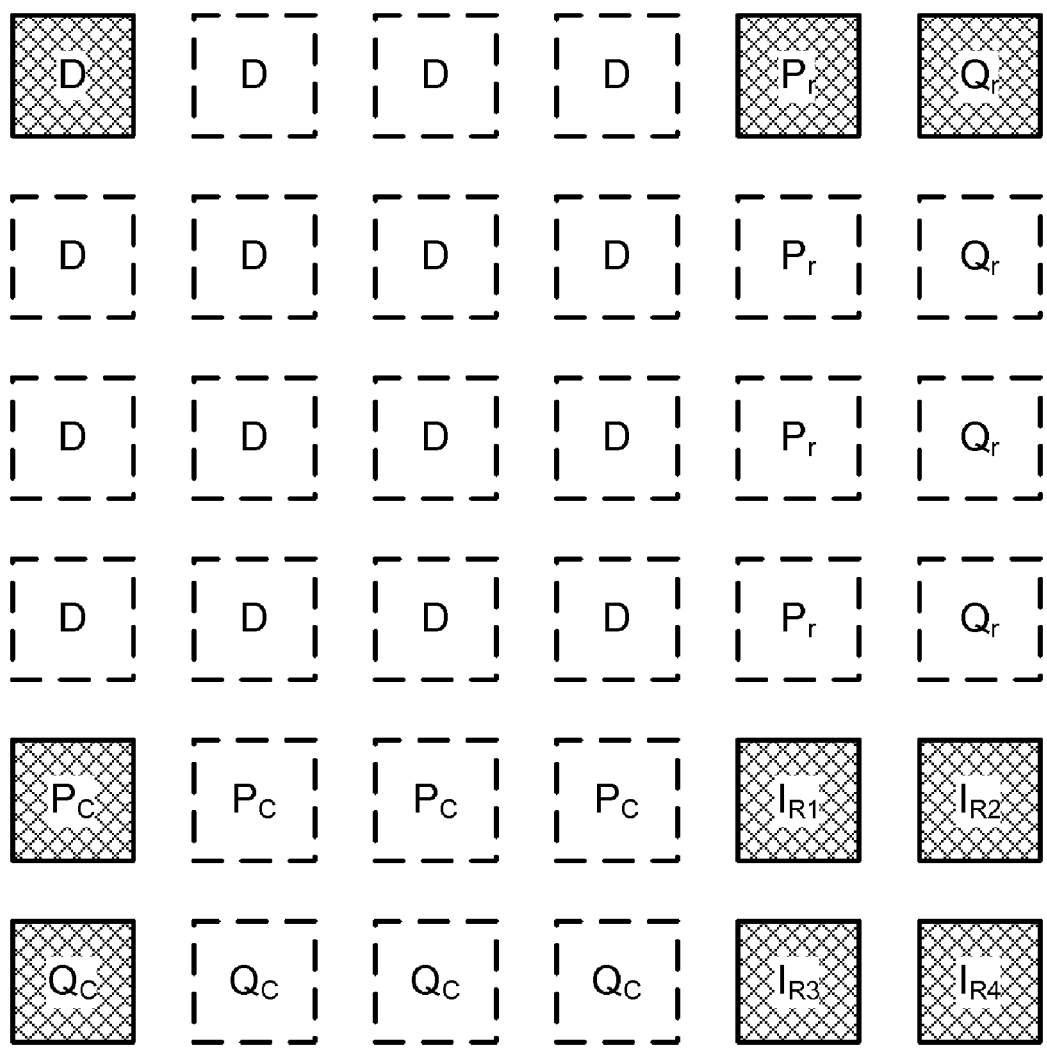

Referring to FIG. 8C, the parity values in RAID grid locations (806, 808, 810, 812) in RAID grid 4 (802) are updated using the current values in the respective RAID grid locations (806, 808, 810, 812) along with the data in RAID grid location (804). Once the parity the values in RAID grid 4 (802) are updated, the parity values in the intersection group (814) in RAID grid 4 (802) are updated using the updated parity values in RAID grid locations (806, 808, 810, 812) in RAID grid 4 (802). Referring to FIG. 8D, FIG. 8D shows the result of updating the parity values in RAID grid 4.

Figure 8E:
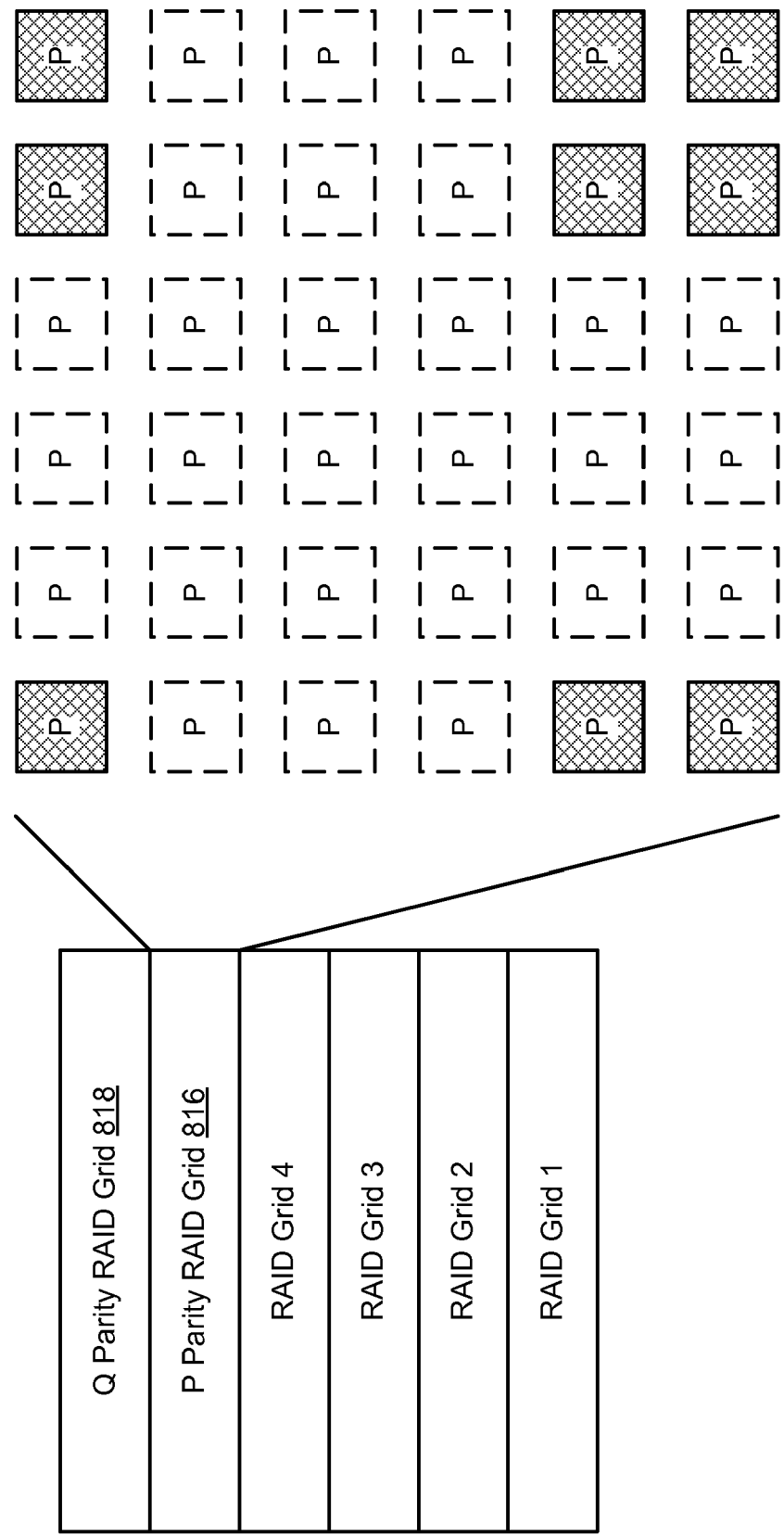

Referring to FIG. 8E, FIG. 8E shows the RAID grid locations in the P Parity Grid that are updated in response to (i) the new data in the RAID grid location (804) and (ii) the updated parity values in RAID grid 4. Those skilled in the art will appreciate that parity values in the P Parity Grid may be updated as soon as the (i) the new data is in vaulted memory or (ii) the individual parity values in RAID grid 4 are updated. Accordingly, the parity values in the P Parity Grid do not need to be updated all at the same time—rather, the parity values can be updated once the necessary data or parity values in RAID grid 4 (802) are available.

Figure 8F:
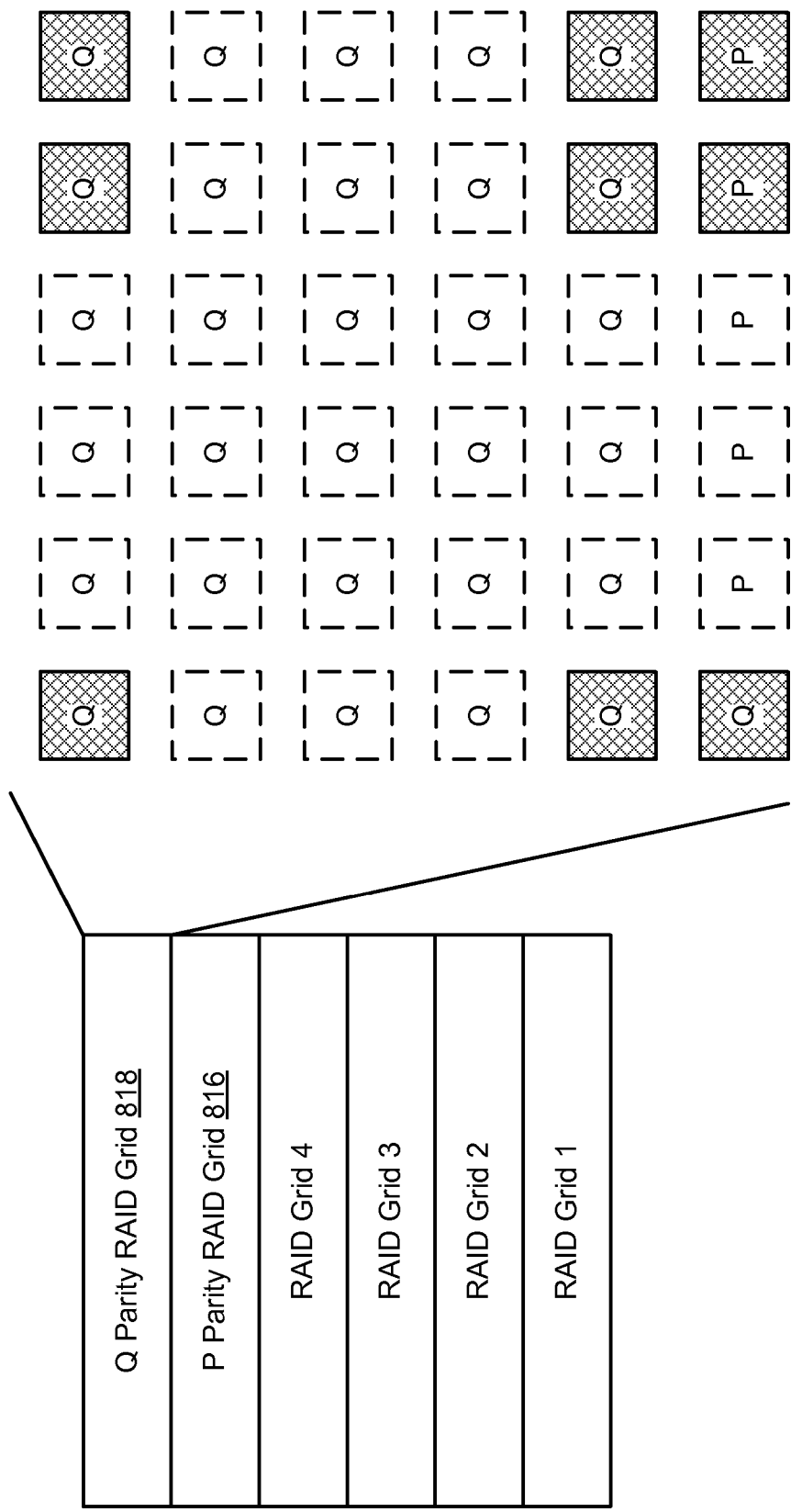

Referring to FIG. 8F, FIG. 8F shows the RAID grid locations in the Q Parity Grid that are updated in response to (i) the new data in the RAID grid location (804) and (ii) the updated parity values in RAID grid 4. Those skilled in the art will appreciate that parity values in the Q Parity Grid may be updated as soon as the (i) the new data is in vaulted memory or (ii) the individual parity values in RAID grid 4 are updated. Accordingly, the parity values in the Q Parity Grid do not need to be updated all at the same time—rather, the parity values may be updated once the necessary data or parity values in RAID grid 4 (802) are available.

Figure 8G:
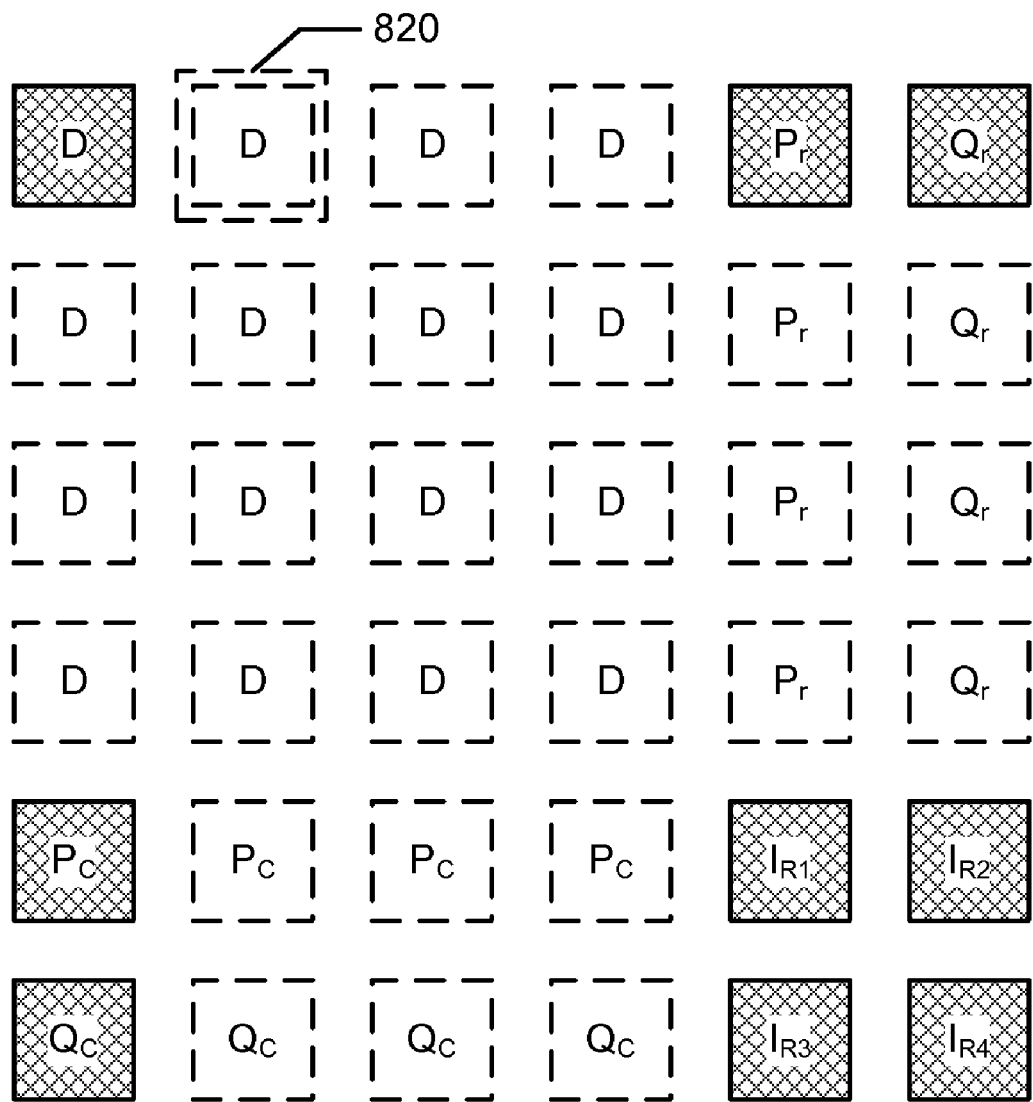

Referring to FIG. 8G, assume that data from the client (denoted as D) is written to a physical address in a solid state memory module that is mapped to RAID grid location (820) in RAID grid 4 (802). As discussed above, the writing of data to a data grid within a RAID grid triggers the process described in FIG. 7C.

Figure 8H:
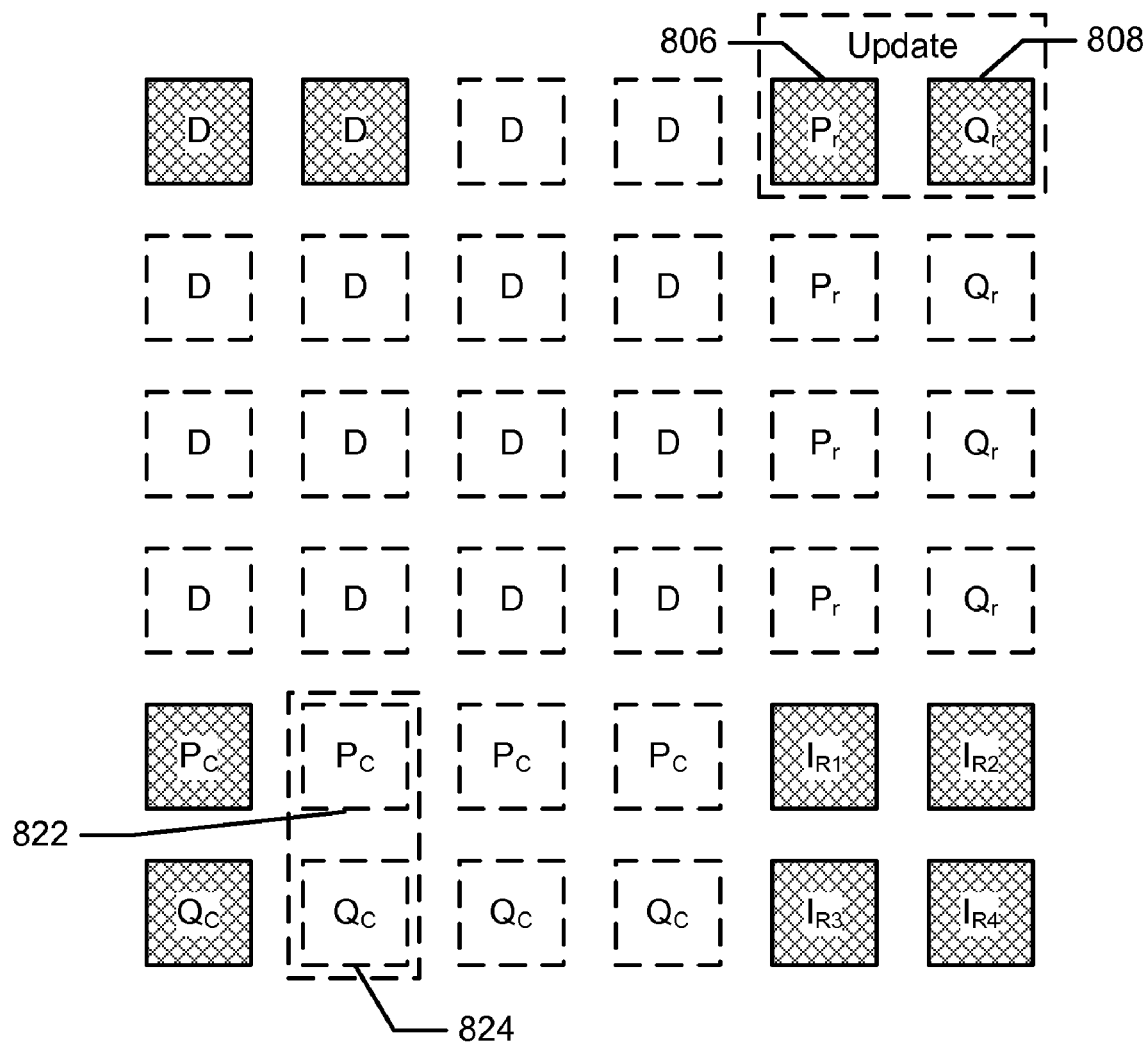

Referring to FIG. 8H, the RAID grid locations to be updated in the (i) Row P Parity Group (806), (ii) Row Q Parity Group (808), (iii) Column P Parity Group (822), (iv) Column Q Parity Group (824), (v) the P Parity Grid, and (vi) the Q Parity Grid are identified. More specifically, as described above, the identified RAID grid locations include parity values that need to be updated in response to the writing of the data in the RAID grid location (804).

Figure 8I:
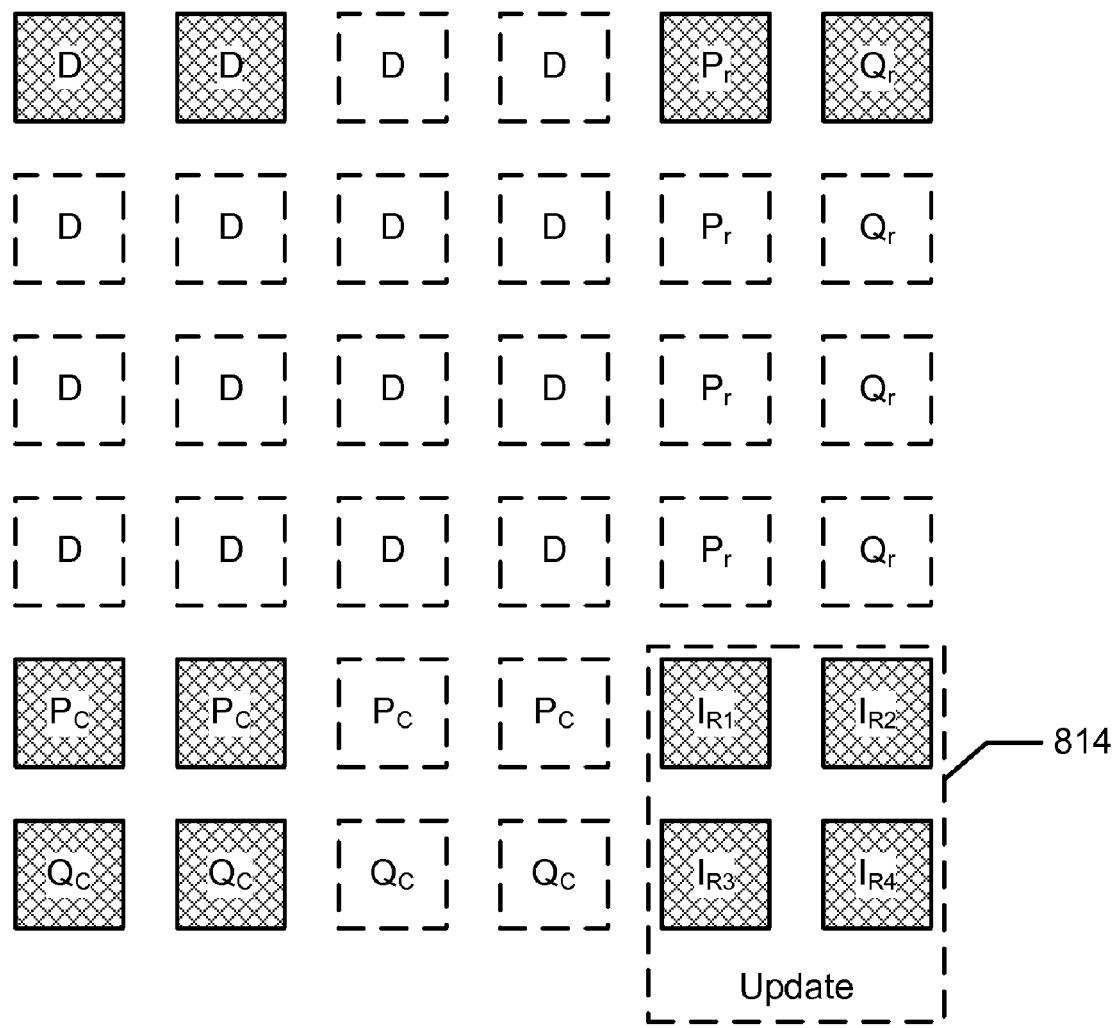

Referring to FIG. 8I, the parity values in RAID grid locations (806, 808, 820, 822) in RAID grid 4 (802) are updated using the current values in the respective RAID grid locations (806, 808, 820, 822) along with the data in RAID grid location (820). Once the parity the values in RAID grid 4 (802) are updated, the parity values in the intersection group (814) in RAID grid 4 (802) are updated using the updated parity values in RAID grid locations (806, 808, 820, 822) in RAID grid 4 (802).

Though not shown in the above example, RAID grid locations in the P Parity Grid and the Q Parity Grid are also updated using the data from the client stored in RAID grid location (820) and/or the updated parity values. Further, as described above, the parity values in the RAID grids are not written to the solid state storage modules until the data portion in the RAID grid (or RAID cube) is filled.

Figure 9:
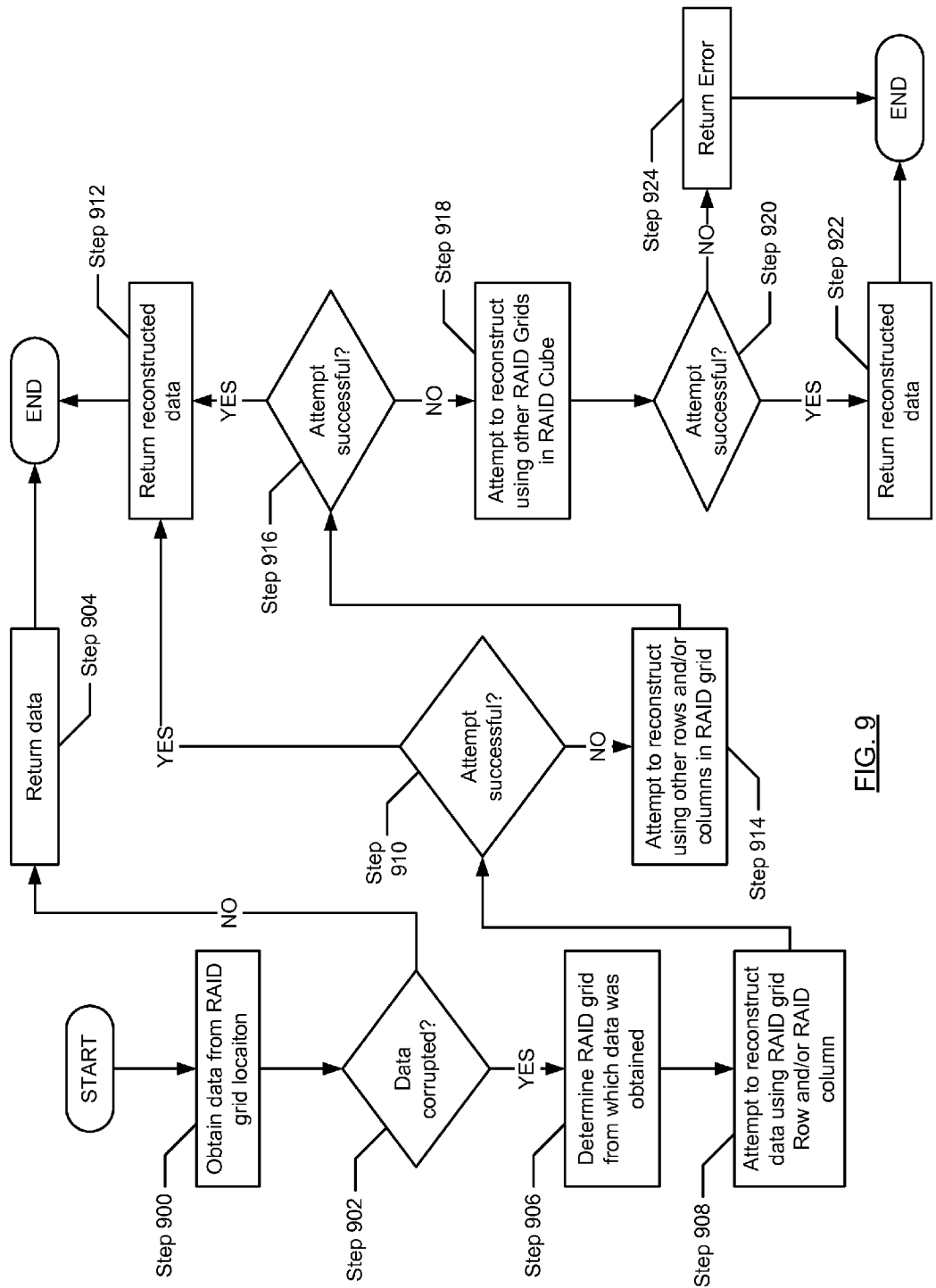
FIG. 9. shows a flow chart in accordance with one or more embodiments of the invention.

FIG. 9. shows a flow chart in accordance with one or more embodiments of the invention. More specifically, FIG. 9 shows a method for obtaining data from a storage module in accordance with one or more embodiments of the invention.

In step 900, data is obtained from a RAID grid location. In one embodiment of the invention, the data is obtained in response to a request from a client. In one embodiment of the invention, the request may specify logical address and the processor (e.g., 208 in FIG. 2A) may use one or more of the data structures described with respect to FIG. 6 to determine the physical address in the storage module at which the requested data is stored. The processor may subsequently obtain the requested data from the storage module.

In step 902, a determination is made about whether the data obtained in step 900 is corrupted. In one embodiment of the invention, the processor may implement any known method (e.g., checksums) for determining whether the data is corrupted. If the data is not corrupted the process proceeds to step 904; otherwise the process proceeds to step 906. In step 904, the data is returned to the client and the process ends. In another in embodiment of the invention, if the data is unable to be obtained—for example, because the persistent storage is damaged or unplugged, or the read command fails, then process may proceed to Step 906.

In step 906, the processor determines from which RAID grid the data was obtained. In step 908, the processor attempts to reconstruct the data using the other RAID grid locations within the row and/or column in which the RAID grid location that included the data is located. In one embodiment of the invention, the parity values may be obtained from the solid state memory module or from vaulted memory (if present in the vaulted memory).

In step 910, a determination is made about whether the reconstruction attempt in step 908 was successful. In one embodiment of the invention, the processor may implement any known method (e.g., checksums) for determining whether the reconstruction attempt was successful. If the reconstruction attempt in step 908 was successful, the process proceeds to step 912; otherwise the process proceeds to step 914. In step 912, the reconstructed data is returned to the client and the process ends.

In step 914, the processor attempts to reconstruct the data using the other RAID grid locations in other rows and/or columns the RAID grid. In step 916, a determination is made about whether the reconstruction attempt in step 914 was successful. In one embodiment of the invention, the processor may implement any known method (e.g., checksums) for determining whether the reconstruction attempt was successful. If the reconstruction attempt in step 914 was successful, the process proceeds to step 912; otherwise the process proceeds to step 918.

In step 918, the processor attempts to reconstruct the data using the other RAID grids in the RAID cube. In step 920, a determination is made about whether the reconstruction attempt in step 918 was successful. In one embodiment of the invention, the processor may implement any known method (e.g., checksums) for determining whether the reconstruction attempt was successful. If the reconstruction attempt in step 918 was successful, the process proceeds to step 922; otherwise the process proceeds to step 924. In step 922, the reconstructed data is returned to the client and the process ends. In step 924, the processor returns an error to the client, which indicates that the requested data cannot be retrieved from the storage module(s).

Those skilled in the art will appreciate that reconstructing the data using the other RAID grids in the RAID cube only occurs in the event that the processor is implementing a 3D RAID scheme.

Figure 10A:
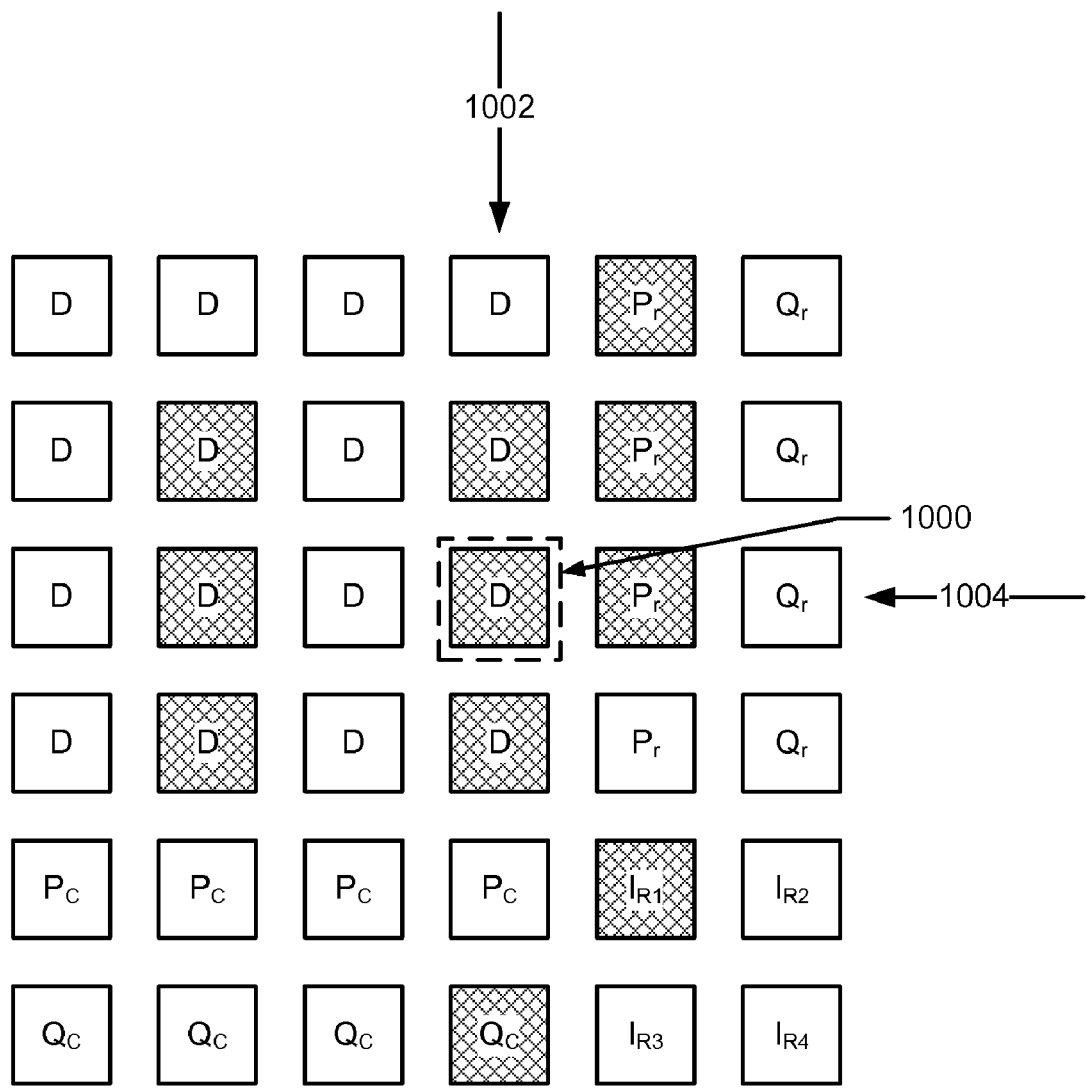
FIGS. 10A-10D show an example in accordance with one or more embodiments of the invention.

FIGS. 10A-10D show an example in accordance with one or more embodiments of the invention. The example is not intended to limit the scope of the invention. Referring to FIG. 10A, consider a scenario in which a client requested data from RAID grid location (1000). However, the data from RAID grid location (1000) is corrupted (as denoted by the shading). The processor first attempts (per step 1008 in FIG. 8) to reconstruct the data in RAID grid location (1000) using data from RAID grid location in row (1004) and/or column (1002). However, because row (1004) and column (1002) each include three RAID grid locations that include corrupted data, the data in RAID grid location (1000) cannot be recovered using only data from row (1004) and/or column (1002).

Figure 10B:
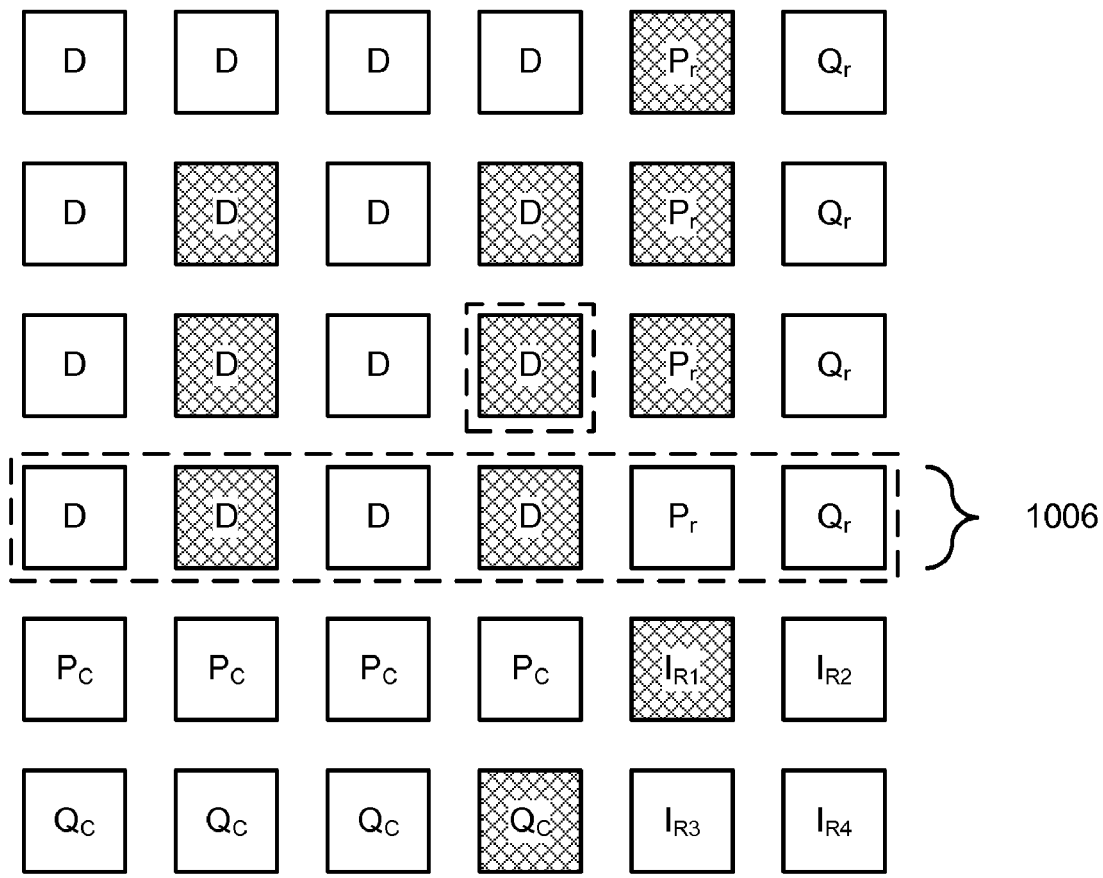
Figure 10C:
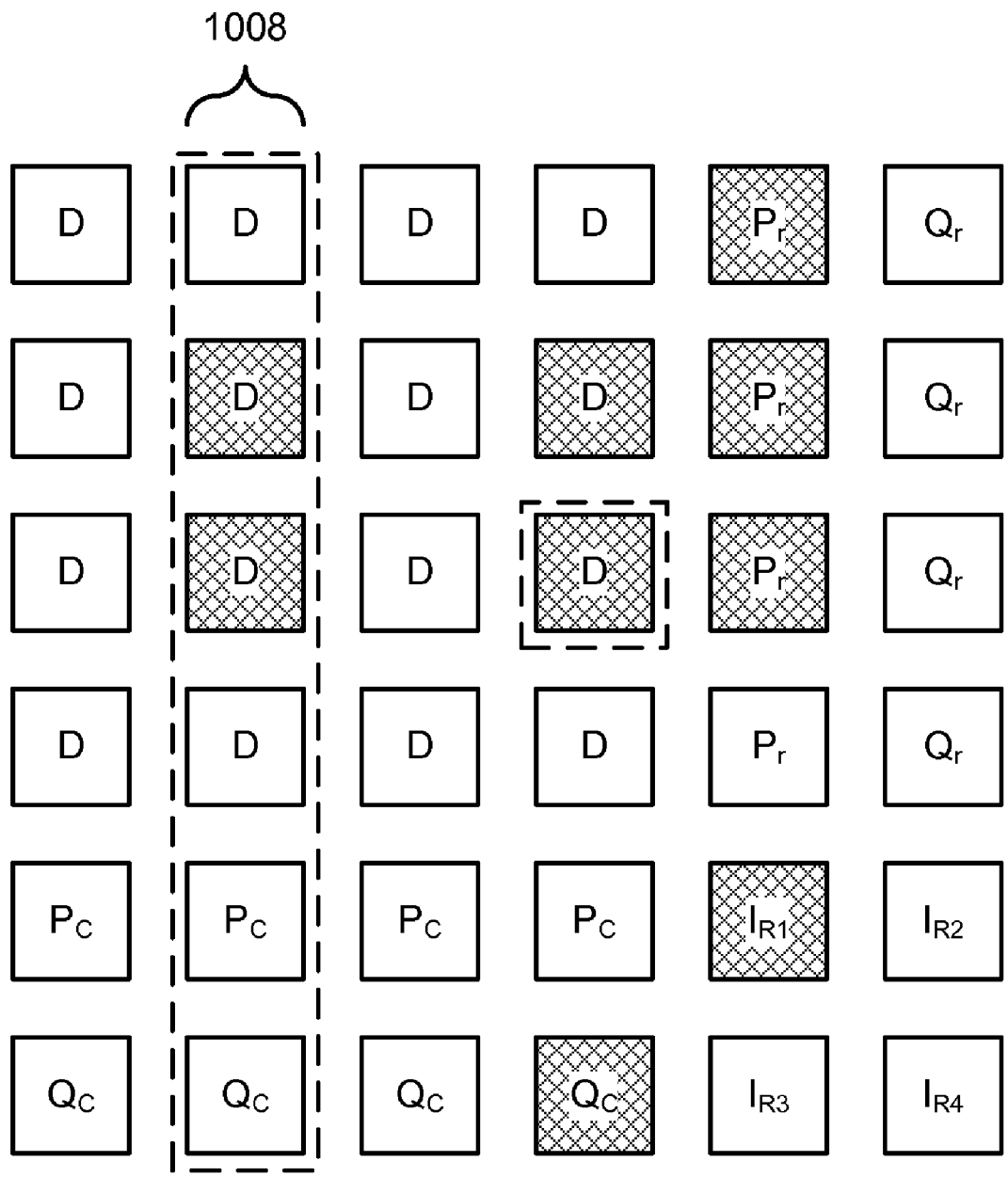
Figure 10D:
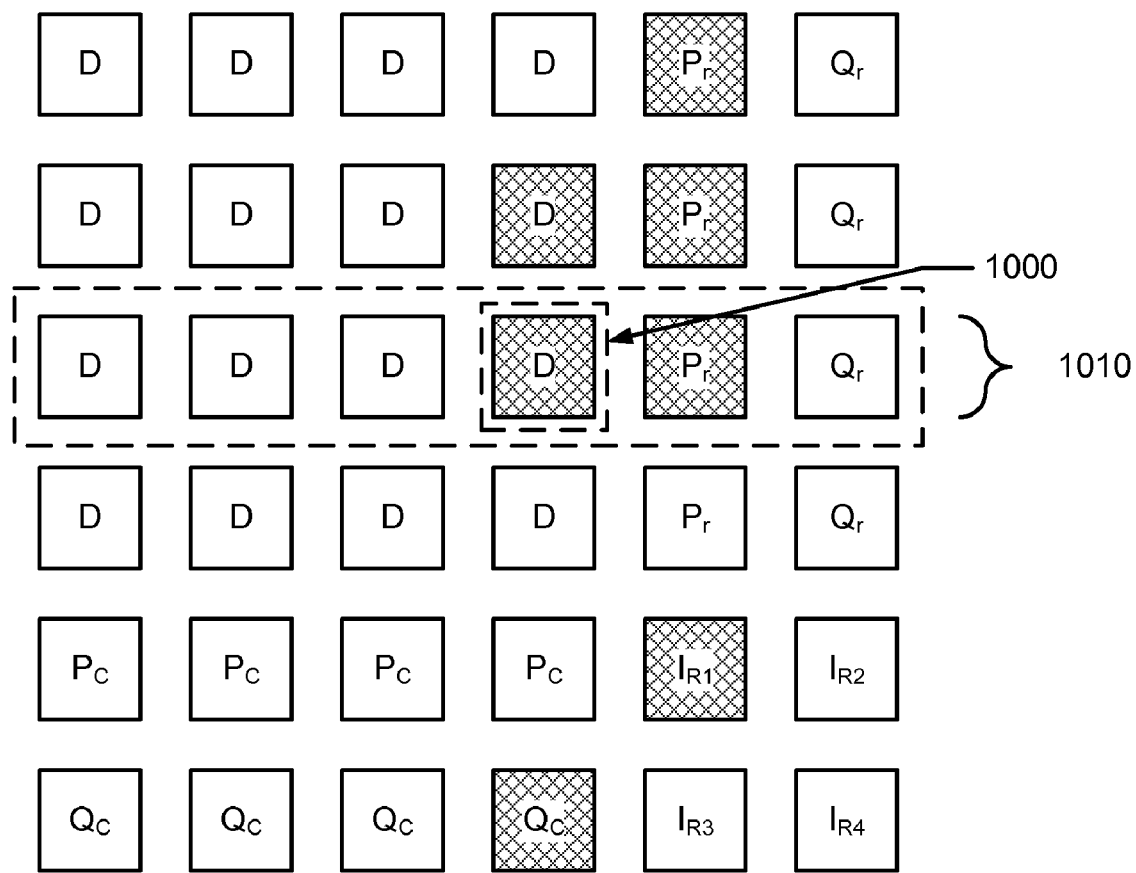

Referring to FIG. 10B, the processor attempts (per step 1014 in FIG. 10) to reconstruct the data in RAID grid location (1000) using data from other RAID grid locations in the RAID grid. In this example, the processor reconstructs all corrupted data in row (1006). Referring to FIG. 10C, based on the reconstruction of the corrupted data in row (1006), the processor is able to reconstruct all corrupted data in column (1008). Finally, referring to FIG. 10D, based on the reconstruction of the corrupted data in column (1008), the processor is able to reconstruct the data in RAID grid location (1000) using the other non-corrupted data in row (1010). In one embodiment of the invention, the reconstruction of the various corrupted data as shown in FIGS. 10B-10D are performed as part of step 914 in FIG. 9.

Though not shown in FIGS. 10A-10D, if the data in RAID grid location (1000) could not be constructed using only the data in the RAID grid, the processor would attempt to reconstruct the data in RAID grid location (1000) (per Step 918 in FIG. 9) using data in other RAID grids within a RAID cube (not shown) if the processor was implementing a 3D RAID scheme.

Those skilled in the art will appreciate that while various examples of the invention has been described with respect to storing data in a storage module along IFDs and/or storing data in NAND flash, embodiments of the invention may be implemented on any multi-dimensional disk array without departing from the invention. For example, one or more embodiments of the invention may be implemented using a two dimensional array of disks (magnetic, optical, solid state, or any other type of storage device), where data for each RAID grid location in a RAID grid is stored on a separate disk.

Further, in one embodiment of the invention, in the event that the storage appliance is implementing a 3D RAID scheme using a two dimensional array of disks, the storage appliance may store data for each of the RAID grid locations using the following n-tuple: <disk x, disk y, logical block address (LBA) z>, where x and y are the dimensions of the disk array. Further, for a given RAID grid the LBA is constant for each RAID grid location for a single RAID grid; however, the LBA is different across the RAID grids in the RAID cube.

The above examples for implementing embodiments of the invention using a two-dimensional disk array are not intended to limit the scope of the invention.

Those skilled in the art will appreciate that while the invention has been described with respect to a 2D RAID scheme and a 3D RAID scheme, embodiments of the invention, may be extended to any multi-dimensional RAID scheme.

Embodiments of the invention allow the system to efficient use memory (including vaulted memory) by only temporarily storing the data from the client while storing the parity data until all the final parity values for the RAID grid or RAID cube have been calculated.

One or more embodiments of the invention may be implemented using instructions executed by one or more processors in the system. Further, such instructions may corresponds to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data comprising:
receiving a first request to write first data;
in response the first request, selecting, a first Redundant Array of Independent Disks (RAID) grid location in a first RAID grid to write the first data, wherein the first RAID grid location is in a first data grid in the first RAID grid;
writing the first data to memory;
updating a data structure to indicate that the first RAID grid location is filled;
identifying a first parity value in the first RAID grid to update in response to the first RAID grid location being filled, wherein the first parity value is associated with a second RAID grid location in the first RAID grid;
updating the first parity value using the first data and the first parity value to obtain an updated first parity value, wherein the updated first parity value is stored in the memory, and wherein the updated first parity value is associated with the second RAID grid location;
prior to the first data grid being filled:
determining a first physical address in persistent storage corresponding to the first RAID grid location;
writing the first data to a first physical location in persistent storage corresponding to the first physical address.

2. The method of claim 1, further comprising:
receiving a second request to write second data;
in response the second request, selecting, a third RAID grid location in the first RAID grid to write the second data, wherein the third RAID grid location is in the first data grid;
writing the second data to the memory;
updating the data structure to indicate that the third RAID grid location is filled;
identifying the updated first parity value in the first RAID grid to update in response to the third RAID grid location being filled;
updating the updated first parity value using the second data and the updated first parity value to obtain an updated second parity value, wherein the updated second parity value is stored in the memory, and wherein the updated second parity value is associated with the second RAID grid location;
prior to the first data grid being filled:
determining a second physical address in persistent storage corresponding to the third RAID grid location;
writing the second data to a second physical location in persistent storage corresponding to the second physical address.

3. The method of claim 2, further comprising:
after the first data grid is filled:
writing the updated second parity value to the persistent storage.

4. The method of claim 1, further comprising:
identifying a second parity value in a Parity RAID grid to update in response to the first RAID grid location being filled, wherein the second parity value is associated with a third RAID grid location in the Parity RAID grid;
updating the second parity value using the first data and the second parity value to obtain an updated second parity value, wherein the updated second parity value is stored in the memory, wherein the updated second parity value is associated with the third RAID grid location.

5. The method of claim 4, further comprising:
after the data grid is filled:
writing the updated first parity value to the persistent storage; and
writing the updated second parity value to the persistent storage.

6. The method of claim 4, wherein the Parity RAID grid is one selected from a group consisting of a P Parity RAID grid and a Q Parity RAID grid.

7. The method of claim 1, further comprising:
receiving a second request to write second data;
in response the second request, selecting, a third RAID grid location in a second RAID grid to write the second data, wherein the third RAID grid location is in a second data grid in the second RAID grid, and wherein the first RAID grid and the second RAID grid and a Parity grid are associated with a RAID cube;
writing the second data to memory;
updating the data structure to indicate that the third RAID grid location is filled;
identifying a second parity value in the second RAID grid to update in response to the second RAID grid location being filled, wherein the second parity value is associated with a fourth RAID grid location in the second RAID grid;
updating the second parity value using the second data and the second parity value to obtain an updated second parity value, wherein the updated second parity value is stored in the memory, and wherein the updated second parity value is associated with the fourth RAID grid location;
identifying a third parity value in the Parity RAID grid to update in response to the third RAID grid location being filled, wherein the third parity value is associated with a fifth RAID grid location in the Parity RAID grid;
updating the third parity value using the second data and the third parity value to obtain an updated third parity value, wherein the updated third parity value is stored in the memory, wherein the updated third parity value is associated with the fifth RAID grid location;
prior to the second data grid being filled:
determining a second physical address in persistent storage corresponding to the second RAID grid location;
writing the second data to a second physical location in persistent storage corresponding to the second physical address.

8. The method of claim 1, wherein the RAID grid is associated with a RAID cube, wherein the RAID cube comprises a first dimension, a second dimension, and a third dimension, wherein the first dimension is associated with a first independent fault domain, the second dimension is associated with a second independent fault domain, and the third dimension is associated with a third independent fault domain.

9. The method of claim 8, wherein the physical location in the persistent storage is specified at least, in part, using the first independent fault domain, the second independent fault domain, and the third independent fault domain.

10. The method of claim 8, wherein the persistent storage comprises a plurality of storage modules, wherein each of the plurality of storage modules comprises solid state memory, and wherein the first independent fault domain is the plurality of storage modules, the second fault domain is a plurality of channels in each of the plurality of storage modules, wherein the third fault domain is a plurality of NAND dies in each of the plurality of storage modules.

11. The method of claim 1, wherein the first parity value comprises at least one selected from a group consisting of a P parity value, a Q parity value, and an intersection parity value.

12. A system, comprising:
a control module comprising:
an Input/Output module (IOM);
a processor;
a first memory connected to the processor;
a switch fabric, wherein the IOM and the processor are connected to the switch fabric;
a first storage module connected to the control module using the switch fabric and comprising:
a second memory;
a first persistent storage;
a second storage module connected to the control module using the switch fabric and comprising:
a third memory;
a second persistent storage;
wherein the control module is configured to:
receive a first request to write first data;
in response the first request, select, a first Redundant Array of Independent Disks (RAID) grid location in a first RAID grid to write the first data, wherein the first RAID grid location is in a first data grid in the first RAID grid;
write the first data to the second memory;
update a data structure in the first memory to indicate that the first RAID grid location is filled;
identify a first parity value in the first RAID grid to update in response to the first RAID grid location being filled, wherein the first parity value is associated with a second RAID grid location in the first RAID grid;
update the first parity value using the first data and the first parity value to obtain an updated first parity value, wherein the updated first parity value is stored in the second memory, and wherein the updated first parity value is associated with the second RAID grid location;
prior to the first data grid being filled:
determine a first physical address in the first persistent storage corresponding to the first RAID grid location;
write the first data to a first physical location in the first persistent storage corresponding to the first physical address.

13. The system of claim 12, wherein the switch fabric implements Peripheral Component Interconnect Express (PCIe) protocol.

14. The system of claim 12, wherein the first persistent storage comprises NAND flash.

15. The system of claim 12, wherein the first persistent storage is a solid state memory module.

16. The system of claim 15, wherein the solid state memory module comprises a plurality of NAND dies.

17. The system of claim 12, wherein the request to write the data is received from the client via a client switch, wherein the client communicates with the client switch using Peripheral Component Interconnect Express (PCIe), and the storage appliance communicates with the client switch using PCIe.

18. The system of claim 12, wherein the second memory comprises vaulted memory, wherein contents of the vaulted memory are automatically written to the first persistent storage in the event of a power failure in the first storage module.

19. A non-transitory computer readable medium comprising instructions, which when executed by a processor perform a method, the method comprising:
receiving a first request to write first data;
in response the first request, selecting, a first Redundant Array of Independent Disks (RAID) grid location in a first RAID grid to write the first data, wherein the first RAID grid location is in a first data grid in the first RAID grid;

writing the first data to memory;
updating a data structure to indicate that the first RAID grid location is filled;
identifying a first parity value in the first RAID grid to update in response to the first RAID grid location being filled, wherein the first parity value is associated with a second RAID grid location in the first RAID grid;
updating the first parity value using the first data and the first parity value to obtain an updated first parity value, wherein the updated first parity value is stored in the memory, and wherein the updated first parity value is associated with the second RAID grid location;
prior to the first data grid being filled:
    determining a first physical address in persistent storage corresponding to the first RAID grid location;
    writing the first data to a first physical location in persistent storage corresponding to the first physical address.

20. The non-transitory computer readable medium of claim 19, the method further comprising:
receiving a second request to write second data;
in response the second request, selecting, a third RAID grid location in the first RAID grid to write the second data, wherein the third RAID grid location is in the first data grid;
writing the second data to the memory;
updating the data structure to indicate that the third RAID grid location is filled;
identifying the updated first parity value in the first RAID grid to update in response to the third RAID grid location being filled;
updating the updated first parity value using the second data and the updated first parity value to obtain an updated second parity value, wherein the updated second parity value is stored in the memory, and wherein the updated second parity value is associated with the second RAID grid location;
prior to the first data grid being filled:
    determining a second physical address in persistent storage corresponding to the third RAID grid location;
    writing the second data to a second physical location in persistent storage corresponding to the second physical address.

* * * * *